US011919318B2

(12) United States Patent
Fukasawa et al.

(10) Patent No.: US 11,919,318 B2
(45) Date of Patent: Mar. 5, 2024

(54) INKJET PRINTING APPARATUS AND INKJET PRINTING METHOD

(71) Applicant: CANON KABUSHIKI KAISHA, Tokyo (JP)

(72) Inventors: Takuya Fukasawa, Yokohama (JP); Yuhei Oikawa, Yokohama (JP); Takatoshi Nakano, Yokohama (JP); Yoshinori Nakagawa, Kawasaki (JP); Atsushi Takahashi, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/471,946

(22) Filed: Sep. 10, 2021

(65) Prior Publication Data

US 2021/0402792 A1 Dec. 30, 2021

Related U.S. Application Data

(63) Continuation of application No. 16/571,579, filed on Sep. 16, 2019, now Pat. No. 11,141,990.

(30) Foreign Application Priority Data

Oct. 5, 2018 (JP) ................................ 2018-190490

(51) Int. Cl.
*B41J 2/18* (2006.01)
*B41J 2/045* (2006.01)

(52) U.S. Cl.
CPC ............. *B41J 2/18* (2013.01); *B41J 2/04563* (2013.01); *B41J 2/0458* (2013.01)

(58) Field of Classification Search
CPC ...... B41J 2/16517; B41J 2/18; B41J 2/04563; B41J 2/16579; B41J 2/175; B41J 2/16505; B41J 2202/12
See application file for complete search history.

(56) References Cited

U.S. PATENT DOCUMENTS

| | | | | |
|---|---|---|---|---|
| 5,956,062 | A | 9/1999 | Omata et al. | 347/89 |
| 6,213,601 | B1 | 4/2001 | Akuzawa et al. | 347/89 |
| 6,354,698 | B1 | 3/2002 | Tachihara et al. | 347/56 |
| 6,547,367 | B1 | 4/2003 | Hamada | 347/23 |
| 6,984,009 | B2 | 1/2006 | Nakagawa et al. | 347/9 |

(Continued)

FOREIGN PATENT DOCUMENTS

| | | |
|---|---|---|
| CN | 101209623 | 7/2008 |
| CN | 101468547 | 7/2009 |

(Continued)

OTHER PUBLICATIONS

Office Action dated Jun. 2, 2021 in counterpart Chinese Application No. 201910921386.2, together with English translation thereof.

(Continued)

*Primary Examiner* — John Zimmermann
(74) *Attorney, Agent, or Firm* — Venable LLP

(57) ABSTRACT

Ink is circulated through a circulation flow path between a print head and an ink tank. Detection operation for detecting an ink ejection state in an ejection opening in the print head is performed. The ink circulation and the detection operation are simultaneously performed by performing the detection operation in response to a start of the ink circulation.

45 Claims, 19 Drawing Sheets

(56) References Cited

U.S. PATENT DOCUMENTS 6,994,416 B2 2/2006 Seki et al. ...................... 347/19
7,011,386 B2 3/2006 Iwasaki et al. ................. 347/23
7,144,096 B2 12/2006 Seki et al. ...................... 347/30
7,396,095 B2 7/2008 Nakagawa et al. ............... 347/9
7,503,638 B2 3/2009 Sato et al. ...................... 347/33
7,841,708 B2 * 11/2010 Morgan ................... B41J 29/08 347/85
7,896,463 B2 3/2011 Nakagawa et al. ............. 347/35
8,141,973 B2 3/2012 Hamazaki et al. ............. 347/11
8,205,973 B2 6/2012 Nitta et al. ...................... 347/85
8,317,287 B2 11/2012 Jogo et al. ...................... 347/14
8,752,930 B2 6/2014 Doi et al. ........................ 347/17
8,827,419 B2 9/2014 Nakagawa et al. ............. 347/30
8,851,618 B2 10/2014 Teshigawara et al. ......... 347/19
8,857,948 B2 10/2014 Suzuki et al. .................. 347/19
8,944,562 B2 2/2015 Nakagawa et al. ............. 347/30
8,967,768 B2 3/2015 Jogo et al. ...................... 347/37
9,096,065 B2 * 8/2015 Nakano ................ B41J 2/16538
9,097,591 B2 8/2015 Ike .......................... G01K 7/16
9,108,410 B2 8/2015 Hamasaki et al. ..... B41J 11/008
9,387,679 B2 7/2016 Shiiba et al. ........ B41J 2/16538
9,446,595 B2 9/2016 Takarabe et al. ...... B41J 2/1652
9,486,997 B2 11/2016 Kamiyanagi ........ B41J 2/16517
9,517,628 B2 12/2016 Tenkawa et al. .... B41J 2/17566
9,707,763 B2 7/2017 Nakagawa et al. .... B41J 29/377
9,862,195 B2 1/2018 Genta et al. ......... B41J 2/16508
10,150,291 B2 12/2018 Nakagawa ........... B41J 2/14032
10,207,506 B2 2/2019 Iwasaki et al. ...... B41J 2/16508
10,265,951 B2 4/2019 Nakano et al. ........ B41J 2/0456
10,286,657 B2 5/2019 Kameshima et al. ...................... B41J 2/04563
10,369,797 B2 8/2019 Genta et al. ......... B41J 2/16508
10,442,191 B2 10/2019 Takahashi et al. .. B41J 2/04586
10,493,762 B2 12/2019 Sato et al. ........... B41J 2/16508
2004/0041862 A1 3/2004 Nakagawa et al. ............... 347/9
2005/0052513 A1 3/2005 Inoue ............................. 347/89
2008/0084463 A1 4/2008 Kawase .......................... 347/89
2008/0158321 A1 7/2008 Nitta et al. ...................... 347/89
2009/0160887 A1 6/2009 Hamazaki et al. ............... 347/7
2010/0134539 A1 6/2010 Nitta et al. ........................ 347/6
2010/0231634 A1 9/2010 Yokota et al. .................. 347/17
2010/0303281 A1 12/2010 Wu et al. ...................... 382/100
2011/0050793 A1 3/2011 Kumagai et al. ............... 347/22
2011/0057973 A1 3/2011 Katsuura et al. ............... 347/14
2011/0063366 A1 3/2011 Sato et al. ...................... 347/33
2011/0211029 A1 * 9/2011 Enomoto ................... B41J 2/18 347/93
2012/0200649 A1 8/2012 Igawa et al. .................... 347/89
2013/0050309 A1 2/2013 Koike et al. ............. B41J 29/38
2013/0100200 A1 4/2013 Hamasaki et al. .............. 347/23
2013/0135381 A1 5/2013 Ike .......................... B41J 29/38
2013/0257976 A1 10/2013 Nakano et al. .......... B41J 2/165
2014/0292891 A1 10/2014 Ike ................................. 347/19
2016/0236463 A1 8/2016 Kamiyanagi ............ B41J 2/045
2019/0001670 A1 1/2019 Fukasawa et al. ......... B41J 2/18
2019/0009522 A1 1/2019 Fukasawa et al. ... B41J 2/16535
2019/0009590 A1 1/2019 Fukasawa et al. ... B41J 2/16532
2020/0108610 A1 4/2020 Kiuchi et al. ........ B41J 2/16538
2020/0108611 A1 4/2020 Nakagawa et al. ........ B41J 2/18
2020/0108612 A1 4/2020 Nakagawa et al. .. B41J 2202/20

FOREIGN PATENT DOCUMENTS

JP H05-330073 12/1993
JP H08-244250 9/1996
JP H11-188870 7/1999
JP 2011-62847 3/2011
JP 2013-043314 3/2013
JP 2013-136235 7/2013
JP 2013-202993 10/2013
JP 2013-233656 11/2013
JP 2014-188868 10/2014
JP 2015-174424 10/2015
JP 2016-150538 8/2016
JP 2017-144699 8/2017
JP 2017-144701 8/2017
JP 2017-159536 9/2017
JP 2017-209934 11/2017
WO 2018/017067 1/2018

OTHER PUBLICATIONS

Office Action dated Mar. 19, 2021 in counterpart India Application No. 201944039917, together with English translation thereof.
Russian Office Action, dated Jul. 10, 2020, in Russian Application No. 2019130973, together with English translation thereof.
European Search Report issued in corresponding European Application No. 19196749.6 dated Feb. 13, 2020.
Office Action dated Feb. 15, 2022 in counterpart Japanese Application No. 2018-190490, together with English translation thereof.
Office Action dated Nov. 18, 2022 in counterpart Korean Application No. 10-2019-0118501 , together with English translation thereof.
Office Action dated Feb. 2, 2023 in counterpart Chinese Application No. 202210849804.3, together with English translation thereof.
Office Action dated Aug. 1, 2023 in counterpart Japanese Application No. 2022-170365, together with English translation thereof.
Office Action dated Dec. 26, 2023 in counterpart Japanese Application No. 2022-170365, together with English translation thereof.

* cited by examiner

| | THRESHOLD FOR EACH INK COLOR (NUMBER OF INACTIVE NOZZLES) |
|---|---|
| K1 | 70 |
| K2 | 70 |
| C | 100 |
| M | 100 |
| Y | 150 |
| TOTAL | 300 |

FIG.12A

| | THRESHOLD FOR EACH INK COLOR (RATIO OF INACTIVE NOZZLES) |
|---|---|
| K1 | 0.09% |
| K2 | 0.09% |
| C | 0.13% |
| M | 0.13% |
| Y | 0.20% |
| TOTAL | 0.39% |

FIG.12B

THRESHOLD FOR EACH CHIP

| CHIP NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| THRESHOLD | 40 | 40 | 40 | 35 | 35 | 35 | 30 | 30 | 30 | 35 | 35 | 35 | 40 | 40 | 40 |

FIG.13A

THRESHOLD FOR EACH CHIP (FOR EACH INK COLOR)

| CHIP NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| K1 | 9 | 9 | 9 | 7 | 7 | 7 | 5 | 5 | 5 | 7 | 7 | 7 | 9 | 9 | 9 |
| K2 | 9 | 9 | 9 | 7 | 7 | 7 | 5 | 5 | 5 | 7 | 7 | 7 | 9 | 9 | 9 |
| C | 10 | 10 | 10 | 10 | 10 | 10 | 10 | 10 | 10 | 10 | 10 | 10 | 10 | 10 | 10 |
| M | 10 | 10 | 10 | 10 | 10 | 10 | 10 | 10 | 10 | 10 | 10 | 10 | 10 | 10 | 10 |
| Y | 15 | 15 | 15 | 15 | 15 | 15 | 15 | 15 | 15 | 15 | 15 | 15 | 15 | 15 | 15 |

FIG.13B

THRESHOLD FOR EACH INK COLOR

| NOZZLE NUMBER | 0 | 1 | 2 | 3 | 4 | 5 | 6 | 7 | 8 | 9 | NUMBER OF DETERMINATION TARGET NOZZLES | NUMBER OF INACTIVE NOZZLES | RATIO OF INACTIVE NOZZLES | THRESHOLD | DETERMINATION RESULT |
|---|---|---|---|---|---|---|---|---|---|---|---|---|---|---|---|
| K1 | ○ | ○ | ◍✕ | ○ | ○ | ○ | ✕ | ○ | ○ | ○ | 9 | 1 | 11% | 15% | OK |
| K2 | ○ | ○ | ○ | ○ | ◍ | ○ | ○ | ○ | ✕ | ✕ | 9 | 2 | 22% | 15% | NG |
| C | ○ | ○ | ○ | ○ | ○ | ○ | ○ | ○ | ○ | ○ | 10 | 0 | 0% | 15% | OK |
| M | ○ | ◍✕ | ○ | ○ | ○ | ○ | ○ | ◍✕ | ○ | ○ | 8 | 0 | 0% | 15% | OK |
| Y | ○ | ○ | ○ | ○ | ✕ | ◍✕ | ○ | ○ | ○ | ○ | 9 | 1 | 11% | 15% | OK |

◍ :INACTIVE DETERMINATION NOZZLE

✕ :DETECTED INACTIVE NOZZLE

FIG.14

INKJET PRINTING APPARATUS AND INKJET PRINTING METHOD

This application is a continuation of application Ser. No. 16/571,579 filed Sep. 16, 2019, and claims priority under 35 U.S.C. § 119 to Japan Application JP 2018-190490 filed in Japan on Oct. 5, 2018; and the contents of all of which are incorporated herein by reference as if set forth in full.

BACKGROUND OF THE INVENTION

Field of the Invention

The present invention relates to an inkjet printing apparatus and inkjet printing method using a print head configured to eject ink to print an image.

Description of the Related Art

Japanese Patent Laid-Open No. 2011-62847 discloses detecting an ink ejection state of a print head, and in the case of detecting that the ink ejection state is not good, performing a recovery operation to improve the ink ejection state and then repeating the detection of the ink ejection state.

SUMMARY OF THE INVENTION

In Japanese Patent Laid-Open No. 2011-062847, since the detection of the ink ejection state and the recovery operation for improving the ink ejection state are sequentially performed, it takes time to detect that the ejection state is good, following detection that the ink ejection state is not good.

The present invention provides an inkjet printing apparatus and inkjet printing method capable of reducing the time required for the detection of the ink ejection state and the recovery operation for recovering the ink ejection state.

The present invention provides an inkjet printing apparatus and inkjet printing method capable of reducing time required for the detection of the ink ejection state and the recovery operation for recovering the ink ejection state.

In the first aspect of the present invention, there is provided an inkjet printing apparatus comprising:

a print head comprising at least one ejection opening and configured to print an image by ejecting ink from the ejection opening;

an ink tank configured to store ink to be supplied to the print head; and a detection unit configured to perform a detection operation for detecting an ink ejection state of the ejection opening, wherein the inkjet printing apparatus further comprises:

a circulation unit configured to circulate ink between the print head and the ink tank through a circulation flow path between the ink tank and the print head; and a control unit configured to cause the circulation unit to circulate ink and cause the detection unit to perform the detection operation by causing the detection unit to perform the detection operation in response to a start of ink circulation of the circulation unit so as to simultaneously circulate ink by the circulation unit and perform the detection operation by the detection unit.

In the second aspect of the present invention, there is provided an inkjet printing apparatus comprising:

a print head comprising at least one ejection opening, a printing element configured to generate energy for ejecting ink from the ejection opening, and a pressure chamber supplied with ink ejected from the ejection opening, and the pressure chamber communicating with the ejection opening, the print head being configured to print an image by ejecting ink from the ejection opening;

an ink tank configured to store ink to be supplied to the print head; and a detection unit configured to perform a detection operation for detecting an ink ejection state of the ejection opening, wherein the inkjet printing apparatus further comprises:

a circulation unit configured to circulate ink between an inside and outside of the pressure chamber by supplying ink such that the ink flows from a supply flow path for supplying ink to the pressure chamber of the print head to a flow path different from the supply flow path through the pressure chamber, and a control unit configured to cause the circulation unit to circulate ink and cause the detection unit to perform the detection operation so as to simultaneously circulate ink by the circulation unit and perform the detection operation by the detection unit.

In the third aspect of the present invention, there is provided an inkjet printing method, comprising:

a circulation step of circulating ink between a print head comprising at least one ejection opening for ejecting ink and an ink tank configured to supply ink to the ejection opening through a circulation flow path between the print head and the ink tank, and a detection step of performing an ink circulation in the circulation step and a detection operation in the detection step by performing a detection operation of detecting an ink ejection state of the ejection opening in response to a start of the ink circulation in the circulation step so as to simultaneously circulate ink in the circulation step and perform the detection operation in the detection step.

According to the present invention, the time required for detecting that the ejection state of the print head is good can be reduced by simultaneously performing the recovery operation and the detection operation.

Further features of the present invention will become apparent from the following description of exemplary embodiments with reference to the attached drawings.

BRIEF DESCRIPTION OF THE DRAWINGS

FIG. 12A and FIG. 12B are tables showing different examples of a first determination method of an ink ejection state;

FIG. 13A and FIG. 13B are tables showing different examples of a second determination method of an ink ejection state;

FIG. 14 is a table showing a third determination method of an ink ejection state;

DESCRIPTION OF THE EMBODIMENTS

Embodiments of the present invention will be described below with reference to the drawings.

First Embodiment

Figure 1:
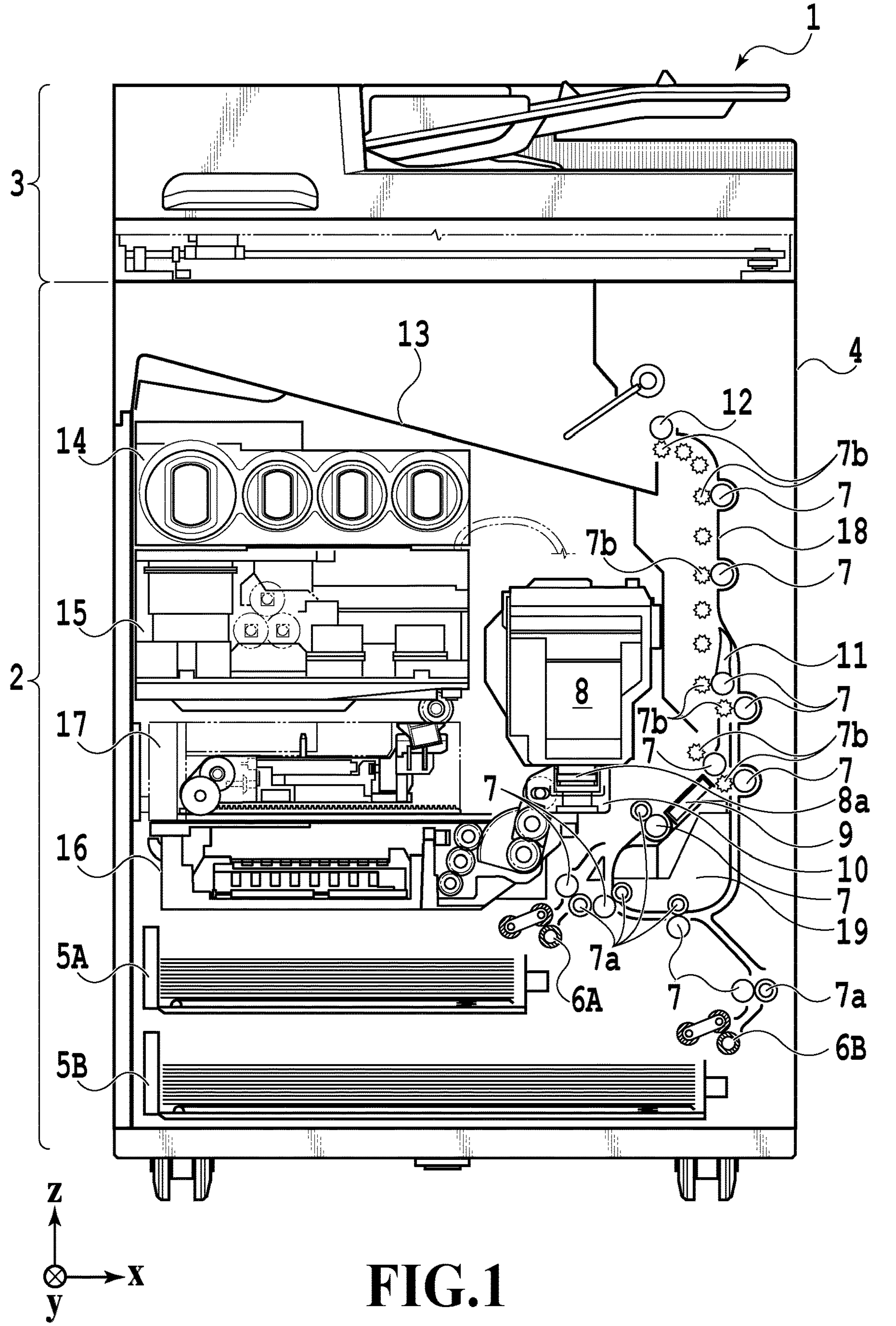
FIG. 1 is a diagram showing a printing apparatus in a standby state.

FIG. 1 is an internal configuration diagram of an inkjet printing apparatus 1 (hereinafter "printing apparatus 1") used in the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing printing medium (cut sheets) S are detachably provided at the bottom of a casing 4 in the vertical direction. Relatively small printing medium of up to A4 size are stacked and housed in the first cassette 5A and relatively large printing medium of up to A3 size are stacked and hosed in the second cassette 5B. A first feeding unit 6A for feeding housed printing medium one by one is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7*a*, spurs 7*b*, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7*a* are follower rollers that are turned while nipping a print medium S together with the conveying rollers 7. The discharging roller 12 is a drive roller located downstream of the conveying rollers 7 and driven by the conveying motor (not shown). The spurs 7*b* nip and convey a print medium S together with the conveying rollers 7 and discharging roller 12 located downstream of the print head 8.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for stacking and housing printing medium S that were subjected to print operation and discharged by the discharging roller 12.

The print head 8 of the present embodiment is a full line type color inkjet print head. In the print head 8, a plurality of ejection openings configured to eject ink based on print data are arrayed in the y-direction in FIG. 1 so as to correspond to the width of a print medium S. That is, the print head is configured to eject inks of a plurality of colors. When the print head 8 is in a standby position, an ejection opening surface 8*a* of the print head 8 is oriented vertically downward and capped with a cap unit 10 as shown in FIG. 1. In print operation, the orientation of the print head 8 is changed by a print controller 202 described later such that the ejection opening surface 8*a* faces a platen 9. The platen 9 includes a flat plate extending in the y-direction and supports a print medium S being subjected to print operation by the print head 8 from the back side. The movement of the print head 8 from the standby position to a printing position will be described later in detail.

An ink tank unit 14 separately stores inks of four colors to be supplied to the print head 8. An ink supply unit 15 is provided in the midstream of a flow path connecting the ink tank unit 14 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance operation will be described later in detail.

Figure 2:
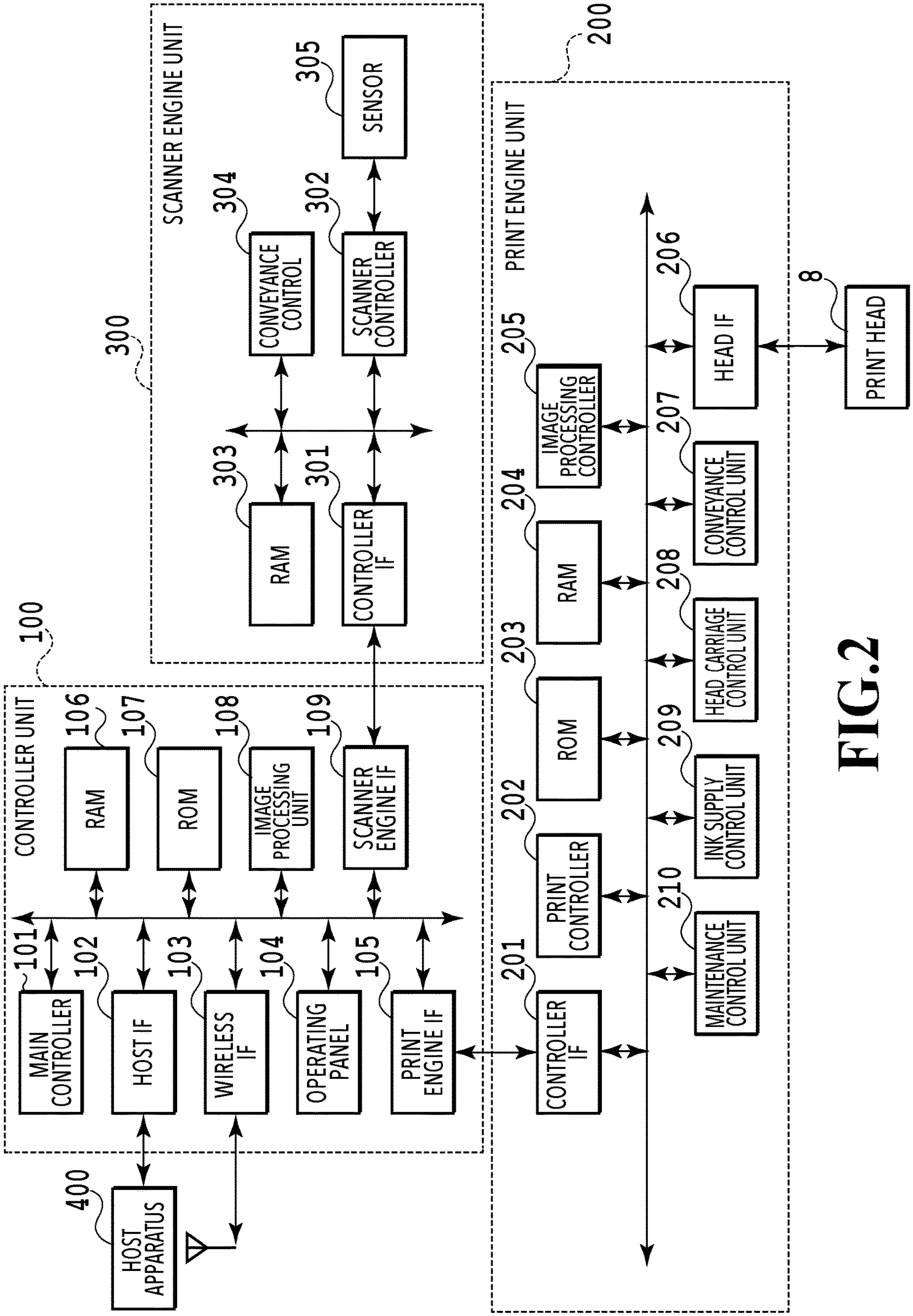
FIG. 2 is a control configuration diagram of the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data under instructions from the main controller 101. The main controller 101 transmits the image data subjected to the image processing to the print engine unit 200 via a print engine I/F 105.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used. For example, when a scan command is input from the host apparatus 400, the main controller 101 transmits the command to the scanner unit 3 via a scanner engine I/F 109.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

In the print engine unit 200, the print controller 202 including a CPU controls various mechanisms of the print unit 2 using a RAM 204 as a work area in accordance with various parameters and programs stored in a ROM 203. When various commands and image data are received via a controller I/F 201, the print controller 202 temporarily stores them in the RAM 204. The print controller 202 allows an image processing controller 205 to convert the stored image data into print data such that the print head 8 can use it for print operation. After the generation of the print data, the print controller 202 allows the print head 8 to perform print operation based on the print data via a head I/F 206. At this time, the print controller 202 conveys a print medium S by driving the feeding units 6A and 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. An ink supply control unit 209 controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
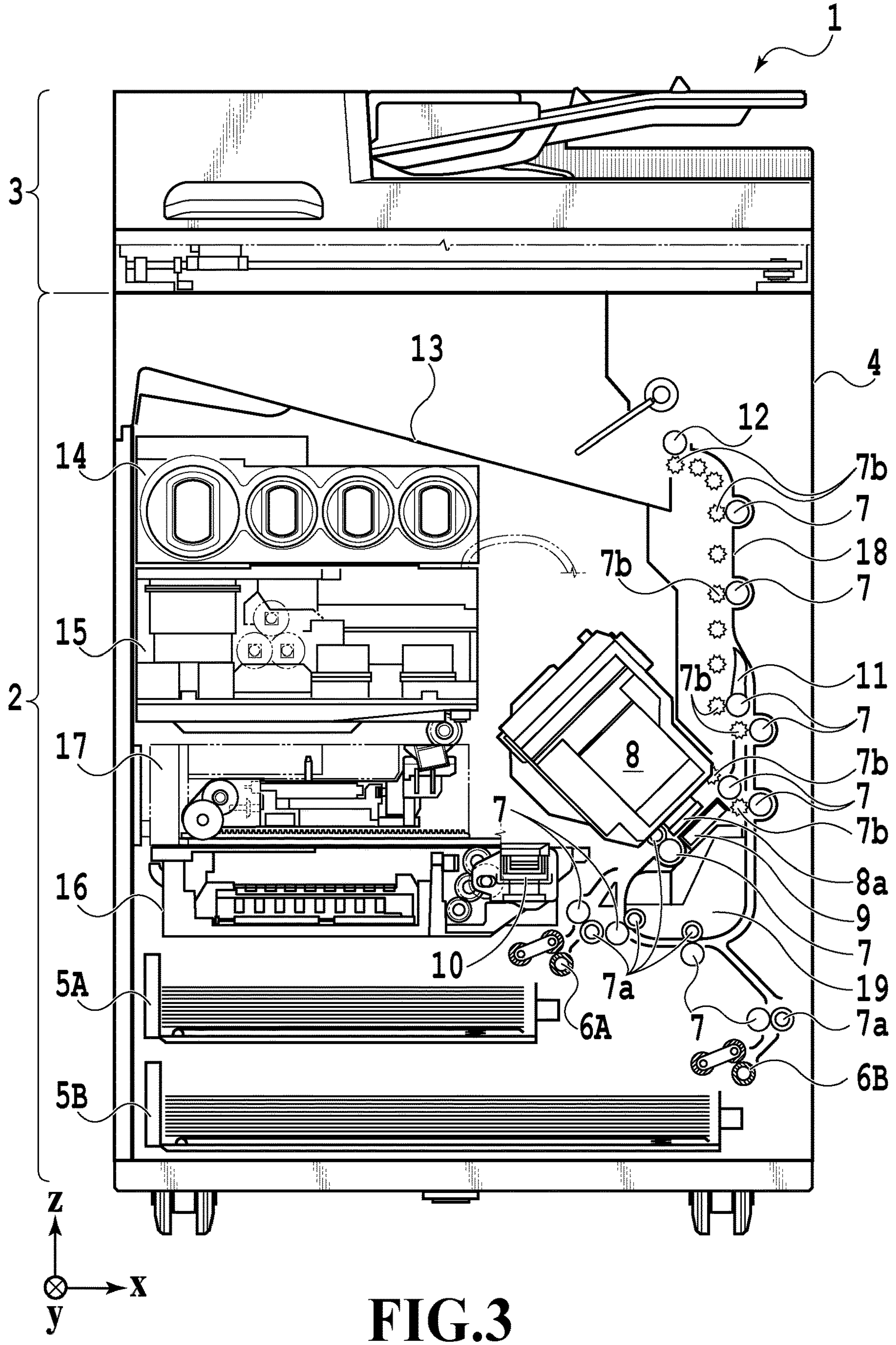
FIG. 3 is a diagram showing the printing apparatus in a printing state.

FIG. 3 shows the printing apparatus 1 in a printing state. As compared with the standby state shown in FIG. 1, the cap unit 10 is separated from the ejection opening surface 8*a* of the print head 8 and the ejection opening surface 8*a* faces the platen 9. In the present embodiment, the plane of the platen 9 is inclined about 45° with respect to the horizontal plane. The ejection opening surface 8*a* of the print head 8 in a printing position is also inclined about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10*a* from the ejection opening surface 8*a* of the print head 8. The print controller 202 then uses the head carriage control unit 208 to turn the print head 8 45° while adjusting the vertical height of the print head 8 such that the ejection opening surface 8*a* faces the platen 9. After the completion of print operation, the print controller 202 reverses the above procedure to move the print head 8 from the printing position to the standby position.

Next, a conveying path of a print medium S in the print unit 2 will be described. When a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

Figure 4C:
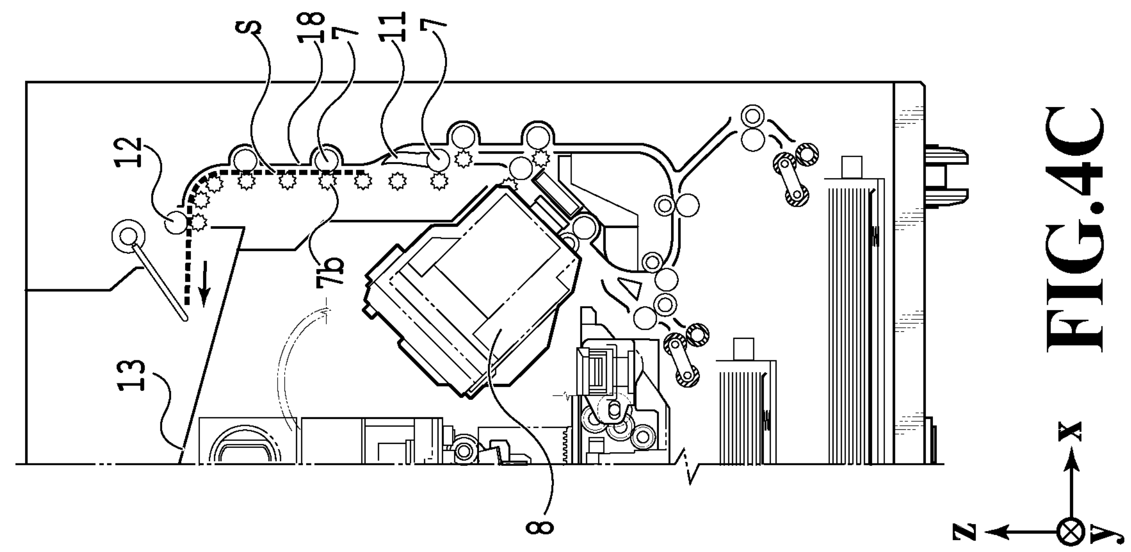
FIG. 4A, FIG. 4B, and FIG. 4C are conveying path diagrams of a print medium fed from a first cassette.
Figure 4B:
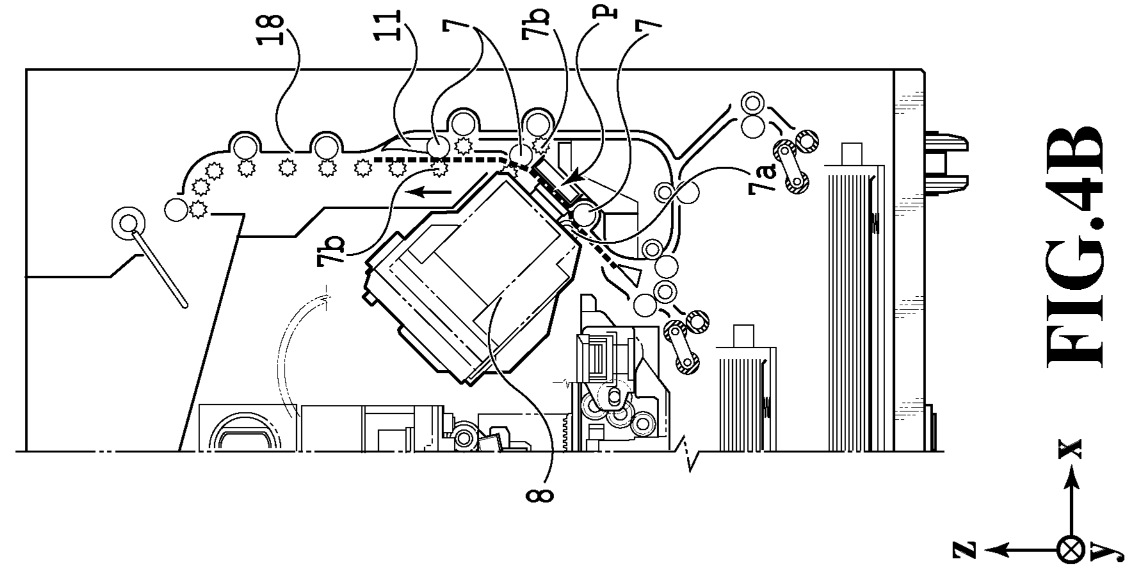
Figure 4A:
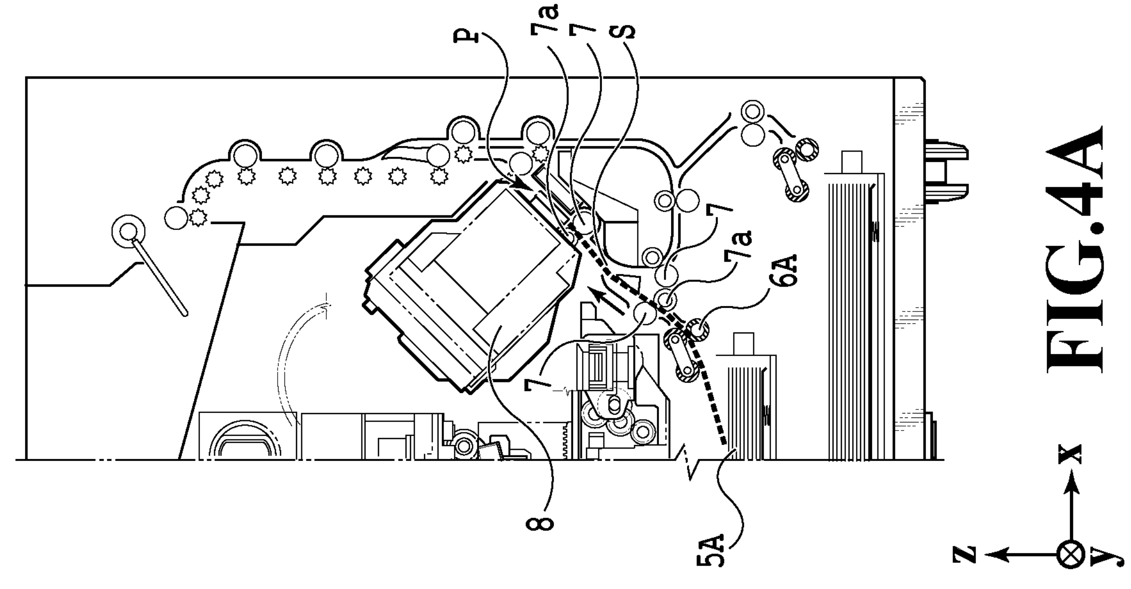

FIG. 4A, FIG. 4B, and FIG. 4C are diagrams showing a conveying path in the case of feeding an A4 size print medium S from the first cassette 5A. A print medium S at the top of a stack of printing medium in the first cassette 5A is separated from the rest of the stack by the first feeding unit 6A and conveyed toward a print area P between the platen 9 and the print head 8 while being nipped between the conveying rollers 7 and the pinch rollers 7*a*. FIG. 4A shows a conveying state where the front end of the print medium S is about to reach the print area P. The direction of movement of the print medium S is changed from the horizontal direction (x-direction) to a direction inclined about 45° with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8*a* and the print medium S. After ink is applied to the print medium S, the conveying rollers 7 and the spurs 7*b* guide the print medium S such that the print medium S passes on the left of the flapper 11 with its tip inclined to the right and is conveyed along the guide 18 in the vertically upward direction of the printing apparatus 1. FIG. 4B shows a state where the front end of the print medium S has passed through the print area P and the print medium S is being conveyed vertically upward. The conveying rollers 7 and the spurs 7*b* change the direction of movement of the print medium S from the direction inclined about 45° with respect to the horizontal direction in the print area P to the vertically upward direction.

After being conveyed vertically upward, the print medium S is discharged into the discharging tray 13 by the discharging roller 12 and the spurs 7*b*. FIG. 4C shows a state where the front end of the print medium S has passed through the discharging roller 12 and the print medium S is being discharged into the discharging tray 13. The discharged print medium S is held in the discharging tray 13 with the side on which an image was printed by the print head 8 down.

Similarly, an A3 size print medium S accommodated in the second cassette 5B is conveyed toward the print area P between the platen 9 and the print head 8. That is, the print medium S at the top of a stack of printing medium in the second cassette 5B is separated from the rest of the stack by the second feeding unit 6B and conveyed toward the print area P between the platen 9 and the print head 8 while being nipped between the conveying rollers 7 and the pinch rollers 7*a*.

In the case of performing duplex printing of an A4 size print medium S, print operation is performed for the second side (back side) after printing the first side (front side). A conveying procedure in the case of printing the first side is the same as that shown in FIG. 4A, FIG. 4B, and FIG. 4C and therefore description will be omitted. After the print head 8 finishes print operation for the first side and the back end of the print medium S passes by the flapper 11, the print controller 202 turns the conveying rollers 7 backward to convey the print medium S into the printing apparatus 1. At this time, since the flapper 11 is controlled by an actuator (not shown) such that the tip of the flapper 11 is inclined to the left, the front end of the print medium S (corresponding to the back end during the print operation for the first side) passes on the right of the flapper 11 and is conveyed vertically downward.

Then, the print medium S is conveyed along the curved outer surface of the inner guide 19 and then conveyed again to the print area P between the print head 8 and the platen 9. At this time, the second side of the print medium S faces the ejection opening surface 8*a* of the print head 8. The rest of the conveying path is the same as that in the case of the print operation for the first side shown in FIG. 4B and FIG. 4C. In a case where the front end of the print medium S has passed through the print area P and the print medium S is being conveyed vertically upward, the flapper 11 is controlled by the actuator (not shown) such that the tip of the flapper 11 is inclined to the right.

Next, maintenance operation for the print head 8 will be described. As described with reference to FIG. 1, the maintenance unit 16 of the present embodiment comprises the cap unit 10 and the wiping unit 17 and activates them at predetermined timings to perform maintenance operation.

Figure 5:
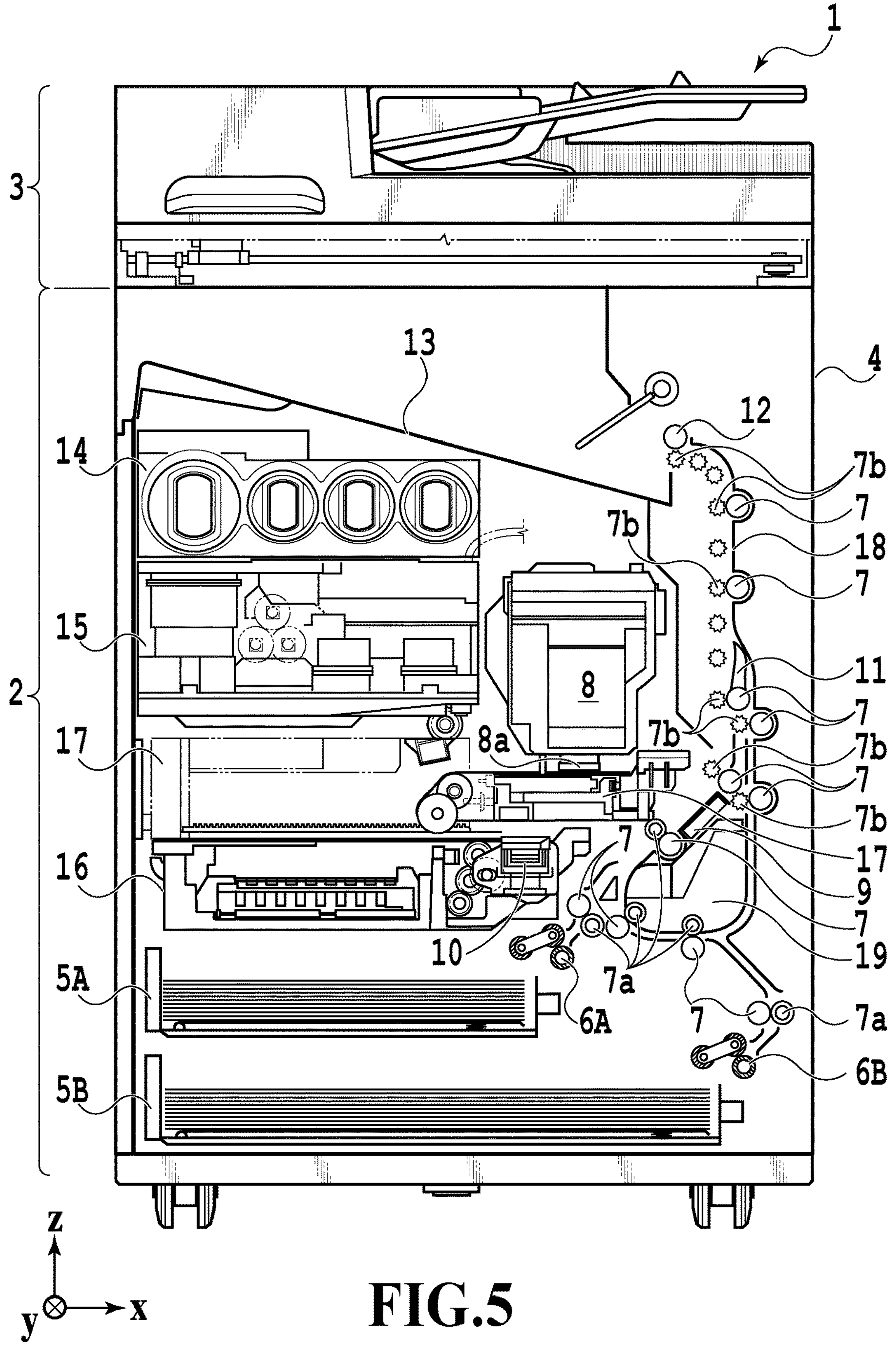
FIG. 5 is a diagram showing the printing apparatus in a maintenance state.

FIG. 5 is a diagram showing the printing apparatus 1 in a maintenance state. In the case of moving the print head 8 from the standby position shown in FIG. 1 to a maintenance position shown in FIG. 5, the print controller 202 moves the print head 8 vertically upward and moves the cap unit 10 vertically downward. The print controller 202 then moves the wiping unit 17 from the evacuation position to the right in FIG. 5. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 5, the print controller 202 moves the print head 8 vertically upward while turning it 45°. The print controller 202 then moves the wiping unit 17 from the evacuation position to the right. Following that, the print controller 202 moves the print head 8 vertically downward to the maintenance position where maintenance operation can be performed.

Figure 6A:
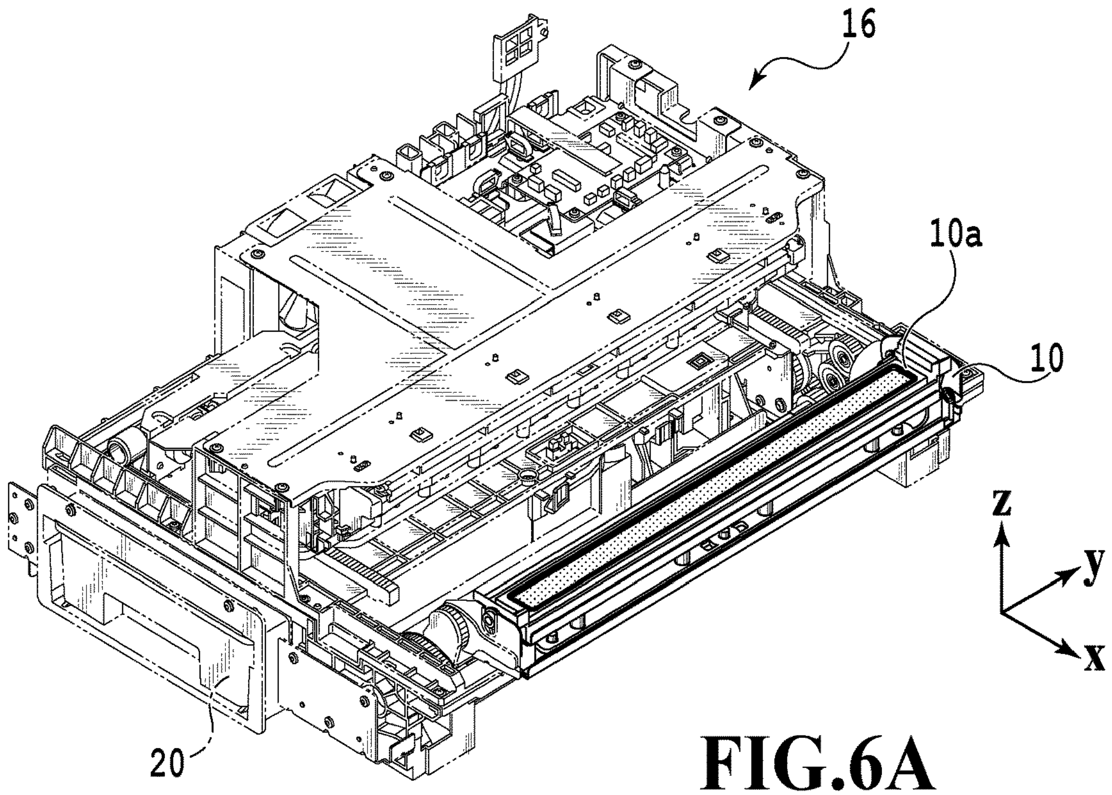
FIG. 6A is a perspective view of a maintenance unit in a standby position and FIG. 6B is a perspective view of the maintenance unit in a maintenance position.
Figure 6B:
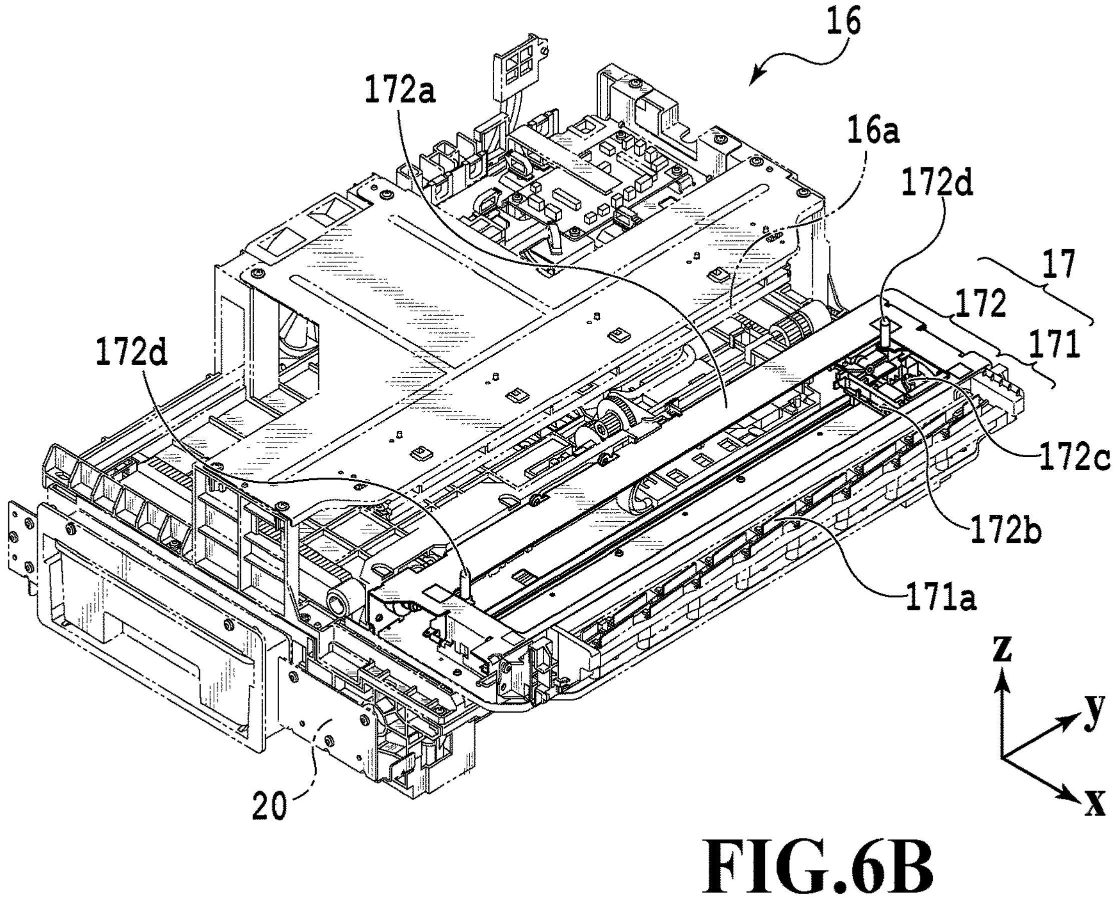

FIG. 6A is a perspective view showing the maintenance unit 16 in a standby position. FIG. 6B is a perspective view showing the maintenance unit 16 in a maintenance position. FIG. 6A corresponds to FIG. 1 and FIG. 6B corresponds to FIG. 5. When the print head 8 is in the standby position, the maintenance unit 16 is in the standby position shown in FIG. 6A, the cap unit 10 has been moved vertically upward, and the wiping unit 17 is housed in the maintenance unit 16. The cap unit 10 comprises a box-shaped cap member 10*a* extending in the y-direction. The cap member 10*a* can be brought into intimate contact with the ejection opening surface 8*a* of the print head 8 to prevent ink from evaporating from the ejection openings. The cap unit 10 also has the function of collecting ink ejected to the cap member 10*a* for preliminary ejection or the like and allowing a suction pump (not shown) to suck the collected ink.

On the other hand, in the maintenance position shown in FIG. 6B, the cap unit 10 has been moved vertically downward and the wiping unit 17 has been drawn from the maintenance unit 16. The wiping unit 17 comprises two wiper units: a blade wiper unit 171 and a vacuum wiper unit 172.

In the blade wiper unit 171, blade wipers 171*a* for wiping the ejection opening surface 8*a* in the x-direction are provided in the y-direction along the length of an area where the ejection openings are arrayed. In the case of performing wiping operation by the use of the blade wiper unit 171, the wiping unit 17 moves the blade wiper unit 171 in the x-direction while the print head 8 is positioned at a height at which the print head 8 can be in contact with the blade wipers 171*a*. This movement enables the blade wipers 171*a* to wipe ink and the like adhering to the ejection opening surface 8*a*.

The entrance of the maintenance unit 16 through which the blade wipers 171*a* are housed is equipped with a wet wiper cleaner 16*a* for removing ink adhering to the blade wipers 171*a* and applying a wetting liquid to the blade wipers 171*a*. The wet wiper cleaner 16*a* removes substances adhering to the blade wipers 171*a* and applies the wetting liquid to the blade wipers 171*a* each time the blade wipers 171*a* are inserted into the maintenance unit 16. The wetting liquid is transferred to the ejection opening surface 8*a* in the next wiping operation for the ejection opening surface 8*a*, thereby facilitating sliding between the ejection opening surface 8*a* and the blade wipers 171*a*.

The vacuum wiper unit 172 comprises a flat plate 172*a* having an opening extending in the y-direction, a carriage 172*b* movable in the y-direction within the opening, and a vacuum wiper 172*c* mounted on the carriage 172*b*. The vacuum wiper 172*c* is provided to wipe the ejection opening surface 8*a* in the y-direction along with the movement of the carriage 172*b*. The tip of the vacuum wiper 172*c* has a suction opening connected to the suction pump (not shown). Accordingly, if the carriage 172*b* is moved in the y-direction while operating the suction pump, ink and the like adhering to the ejection opening surface 8*a* of the print head 8 are wiped and gathered by the vacuum wiper 172*c* and sucked into the suction opening. At this time, the flat plate 172*a* and a dowel pin 172*d* provided at both ends of the opening are used to align the ejection opening surface 8*a* with the vacuum wiper 172*c*.

In the present embodiment, it is possible to carry out a first wiping process in which the blade wiper unit 171 performs wiping operation and the vacuum wiper unit 172 does not perform wiping operation and a second wiping process in which both the wiper units sequentially perform wiping operation. In the case of the first wiping process, the print controller 202 first draws the wiping unit 17 from the maintenance unit 16 while the print head 8 is evacuated vertically above the maintenance position shown in FIG. 5. The print controller 202 moves the print head 8 vertically downward to a position where the print head 8 can be in contact with the blade wipers 171*a* and then moves the wiping unit 17 into the maintenance unit 16. This movement enables the blade wipers 171*a* to wipe ink and the like adhering to the ejection opening surface 8*a*. That is, the blade wipers 171*a* wipe the ejection opening surface 8*a* when moving from a position drawn from the maintenance unit 16 into the maintenance unit 16.

After the blade wiper unit 171 is housed, the print controller 202 moves the cap unit 10 vertically upward and brings the cap member 10*a* into intimate contact with the ejection opening surface 8*a* of the print head 8. In this state, the print controller 202 drives the print head 8 to perform preliminary ejection and allows the suction pump to suck ink collected in the cap member 10*a*.

In the case of the second wiping process, the print controller 202 first slides the wiping unit 17 to draw it from the maintenance unit 16 while the print head 8 is evacuated vertically above the maintenance position shown in FIG. 5. The print controller 202 moves the print head 8 vertically downward to the position where the print head 8 can be in contact with the blade wipers 171*a* and then moves the wiping unit 17 into the maintenance unit 16. This movement enables the blade wipers 171*a* to perform wiping operation for the ejection opening surface 8*a*. Next, the print controller 202 slides the wiping unit 17 to draw it from the maintenance unit 16 to a predetermined position while the print head 8 is evacuated again vertically above the maintenance position shown in FIG. 5. Then, the print controller 202 uses the flat plate 172*a* and the dowel pins 172*d* to align the ejection opening surface 8*a* with the vacuum wiper unit 172 while moving the print head 8 down to a wiping position shown in FIG. 5. After that, the print controller 202 allows the vacuum wiper unit 172 to perform the wiping operation described above. After evacuating the print head 8 vertically upward and housing the wiping unit 17, the print controller 202 allows the cap unit 10 to perform preliminary ejection into the cap member 10*a* and suction operation of collected ink in the same manner as the first wiping process.

(Ink Supply Unit)

Figure 7:
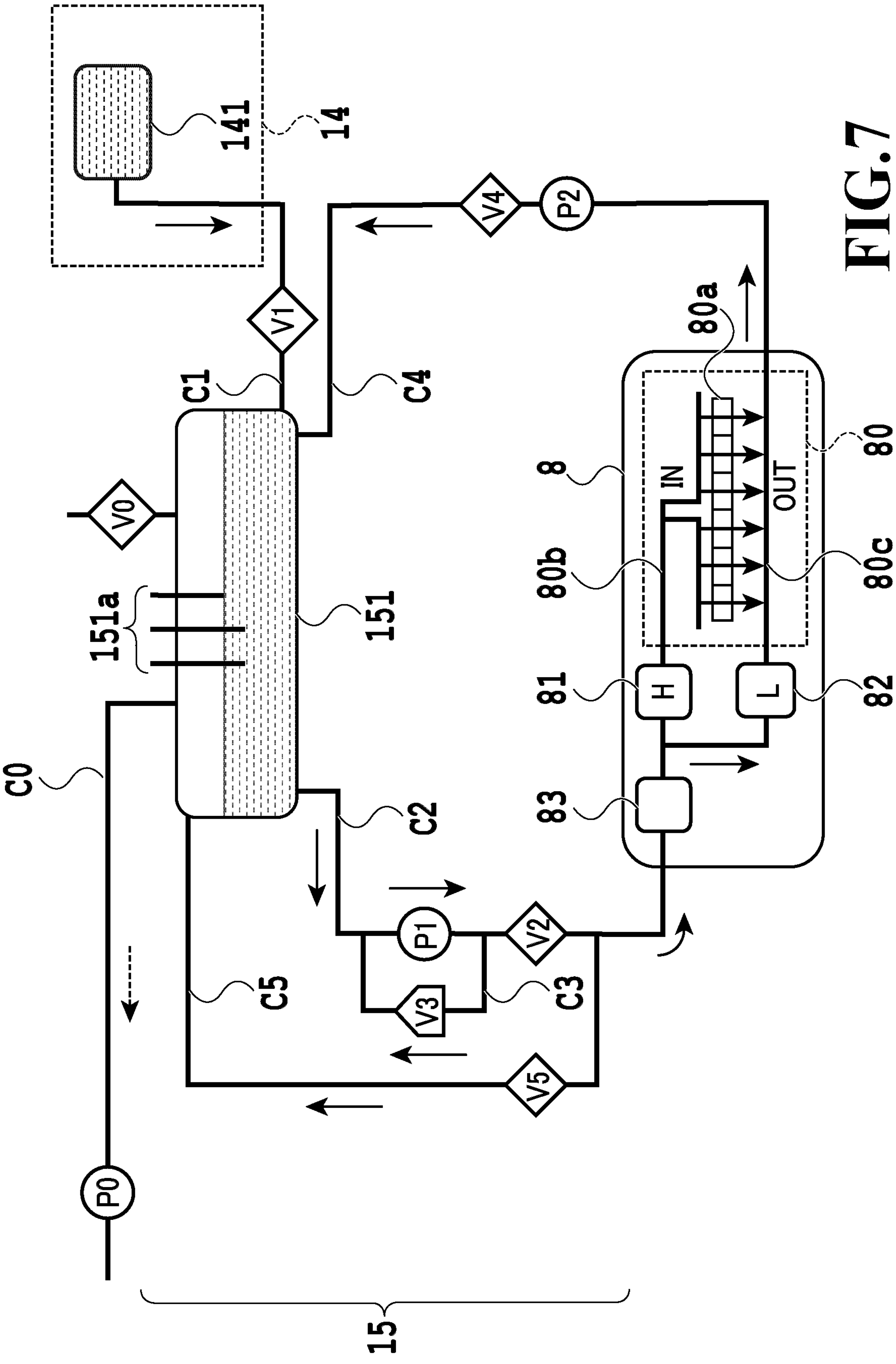
FIG. 7 is a diagram showing a flow path configuration of an ink circulation system.

FIG. 7 is a diagram including the ink supply unit 15 adopted in the inkjet printing apparatus 1 of the present embodiment. A flow path configuration of an ink circulation system of the present embodiment will be described with reference to FIG. 7. The ink supply unit 15 supplies ink from the ink tank unit 14 to the print head 8. Although FIG. 7 shows the configuration for an ink of one color, such configurations are actually prepared for respective ink colors. The ink supply unit 15 is basically controlled by the ink supply control unit 209 shown in FIG. 2. The configuration of the ink supply unit 15 will be described below.

Ink is mainly circulated between a sub-tank 151 and the print head 8. In the print head 8, ink ejection operation is performed based on image data and ink that has not been ejected is collected to the sub-tank 151 again.

The sub-tank 151 storing a predetermined amount of ink is connected to a supply flow path C2 for supplying ink to the print head 8 and a collection flow path C4 for collecting ink from the print head 8. That is, the sub-tank 151, the supply flow path C2, the print head 8, and the collection flow path C4 form a circulation path to be a circulation flow path through which ink is circulated. The sub-tank 151 is also connected to a flow path C0 through which air flows.

The sub-tank 151 is equipped with a liquid surface detection unit 151*a* comprising a plurality of electrode pins. By detecting the presence/absence of continuity/current between these pins, the ink supply control unit 209 can grasp the height of the ink liquid surface, that is, the amount of ink remaining in the sub-tank 151. A decompression pump P0 is a negative pressure source for decompressing the inside of the sub-tank 151. An air release valve V0 is a valve for switching communication and non-communication between air and the inside of the sub-tank 151.

A main tank 141 is a tank storing ink to be supplied to the sub-tank 151. The main tank 141 is attachable to and detachable from the printing apparatus body. In the midstream of a tank connection flow path C1 connecting the sub-tank 151 to the main tank 141, there is provided a tank supply valve V1 for switching the connection between the sub-tank 151 and the main tank 141.

In a case where the liquid surface detection unit 151*a* detects that the amount of ink in the sub-tank 151 becomes less than a predetermined amount, the ink supply control unit 209 closes the air release valve V0, a supply valve V2, a collection valve V4, and a head replacement valve V5 and opens the tank supply valve V1. In this state, the ink supply control unit 209 activates the decompression pump P0. This makes the pressure inside the sub-tank 151 negative, whereby ink is supplied from the main tank 141 to the sub-tank 151. In a case where the liquid surface detection unit 151*a* detects that the amount of ink inside the sub-tank 151 exceeds the predetermined amount, the ink supply control unit 209 closes the tank supply valve V1 and stops the decompression pump P0.

The supply flow path C2 is a flow path for supplying ink from the sub-tank 151 to the print head 8. In the midstream of the supply flow path C2, a supply pump P1 and the supply valve V2 are provided. During print operation, ink can be circulated through the circulation path while being supplied to the print head 8 by driving the supply pump P1 with the supply valve V2 open. The amount of ink ejected by the print head 8 per unit time varies according to image data. The flow rate of the supply pump P1 is determined so as to deal with the case where the print head 8 performs such ejection operation that the ink consumption per unit time becomes maximum.

A relief flow path C3 is a flow path formed upstream of the supply valve V2 for connecting the upstream side and downstream side of the supply pump P1. In the midstream of the relief flow path C3, there is provided a relief valve V3 that is a differential pressure valve. The relief valve is not opened/closed by a driving mechanism but is biased by a spring so as to open in the case of reaching a predetermined pressure. For example, it is assumed that the amount of ink supplied from the supply pump P1 to an IN flow path 80*b* per unit time is greater than the sum total of the amount of ejection of the print head 8 per unit time and the amount of ink flowing from a collection pump P2 to the collection flow path C4 per unit time. In this case, the relief valve V3 opens in response to the pressure acting on itself. This forms a cyclic flow path composed of part of the supply flow path C2 and the relief flow path C3. Providing the relief flow path C3 makes it possible to adjust the amount of ink supplied to the print head 8 according to the ink consumption in the print head 8 and stabilize the pressure inside the circulation flow path regardless of image data.

The collection flow path C4 is a flow path for collecting ink from the print head 8 to the sub-tank 151. In the midstream of the collection flow path C4, the collection pump P2 and the collection valve V4 are provided. In the case of circulating ink through the circulation path, the collection pump P2 serves as a negative pressure source to suck ink from the print head 8. Driving the collection pump P2 generates a suitable pressure difference between the IN flow path 80*b* and an OUT flow path 80*c* in the print head 8, thereby circulating ink between the IN flow path 80*b* and the OUT flow path 80*c*.

The collection valve V4 also serves as a valve for preventing backflow in a case where print operation is not performed, that is, ink is not circulated through the circulation path. In the circulation path of the present embodiment, the sub-tank 151 is located above the print head 8 in the vertical direction (see FIG. 1). Accordingly, in a case where the supply pump P1 or the collection pump P2 is not driven, there is a possibility that ink flows backward from the sub-tank 151 to the print head 8 due to a water head difference between the sub-tank 151 and the print head 8. To prevent such backflow, the collection flow path C4 is provided with the collection valve V4 in the present embodiment.

Incidentally, the supply valve V2 also serves as a valve for preventing ink supply from the sub-tank 151 to the print head 8 in a case where print operation is not performed, that is, ink is not circulated through the circulation path.

A head replacement flow path C5 is a flow path for connecting the supply flow path C2 to an air chamber (space not storing ink) of the sub-tank 151. In the midstream of the head replacement flow path C5, the head replacement valve V5 is provided. One end of the head replacement flow path C5 is connected to the supply flow path C2 upstream of the print head 8 and downstream of the supply valve V2. The other end of the head replacement flow path C5 is connected to the upper side of the sub-tank 151 to communicate with the air chamber inside the sub-tank 151. The head replacement flow path C5 is used to pull ink out of the print head 8 in use, for example, in the case of replacing the print head 8 or transporting the printing apparatus 1. The head replacement valve V5 is controlled by the ink supply control unit 209 so as to be closed except in the cases of filling the print head 8 with ink and collecting ink from the print head 8.

Next, the flow path configuration inside the print head 8 will be described. Ink supplied from the supply flow path C2 to the print head 8 passes through a filter 83 and is then supplied to a first negative pressure control unit 81 and a second negative pressure control unit 82. The control pressure of the first negative pressure control unit 81 is set to a weak negative pressure (negative pressure with a small difference with atmospheric pressure), for example, −90 mmAq. The control pressure of the second negative pressure control unit 82 is set to a strong negative pressure (negative pressure with a large difference with atmospheric pressure), for example, −180 mmAq. The pressures in the first negative pressure control unit 81 and the second negative pressure control unit 82 are generated within a suitable range by driving the collection pump P2.

An ink ejection unit 80 has a plurality of printing element substrates 80*a*, in each of which a plurality of ejection openings are arrayed to form an elongated ejection opening array. A common supply flow path 80*b* (IN flow path) for guiding ink supplied from the first negative pressure control unit 81 and a common collection flow path 80*c* (OUT flow path) for guiding ink supplied from the second negative pressure control unit 82 extend in the array direction of the printing element substrates 80*a*. Each printing element substrate 80*a* is equipped with an individual supply flow path connected to the common supply flow path 80*b* and an individual collection flow path connected to the common collection flow path 80*c*. Accordingly, in each printing element substrate 80*a*, an ink flow is produced such that ink flows from the common supply flow path 80*b* with relatively weak negative pressure to the common collection flow path 80*c* with relatively strong negative pressure. A pressure chamber communicating with each ejection opening and filled with ink is provided in a path between the individual supply flow path and the individual collection flow path, and an ink flow is produced also in an ejection opening and pressure chamber not performing printing. In a case where ejection operation is performed in the printing element substrate 80*a*, ink moving from the common supply flow path 80*b* to the common collection flow path 80*c* is partly consumed by being ejected from the ejection opening. Ink that has not been ejected moves to the collection flow path C4 through the common collection flow path 80*c*.

Figure 8A:
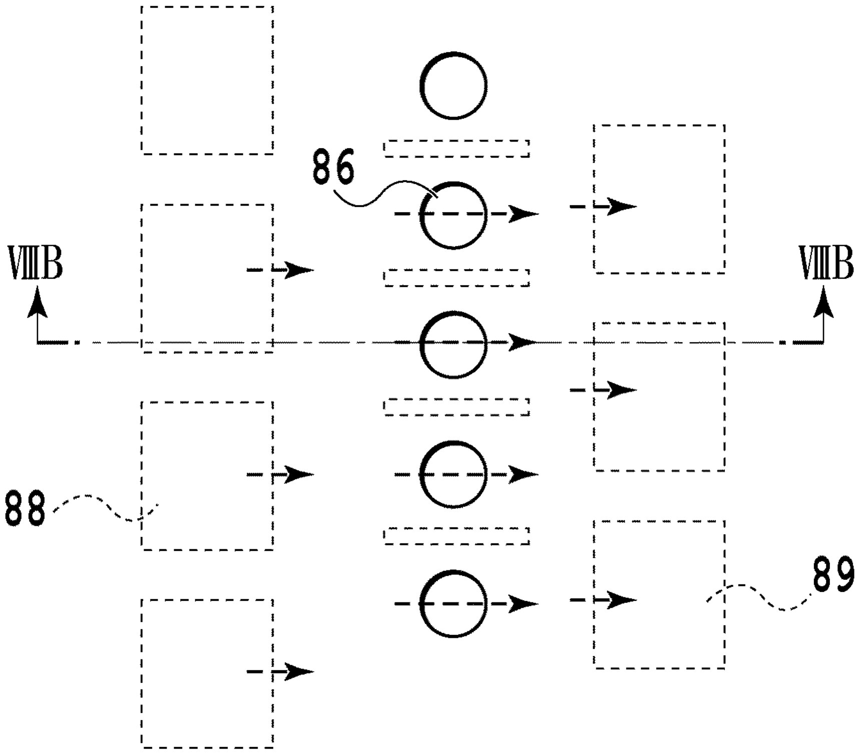
FIG. 8A is an enlarged plan view of part of a printing element substrate and FIG. 8B is a cross-sectional view along line VIIIB-VIIIB in FIG. 8A.
Figure 8B:
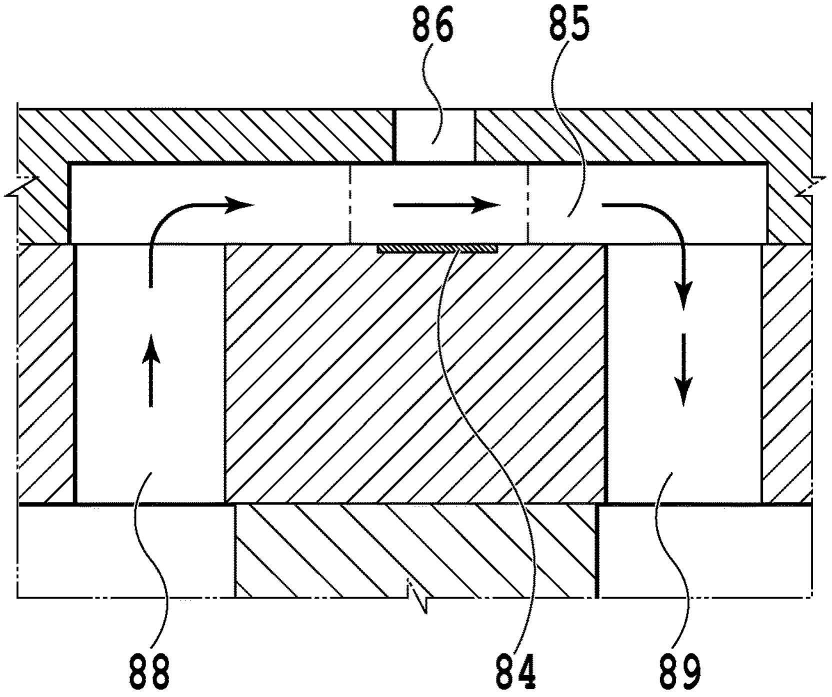

FIG. 8A is an enlarged schematic plan view showing part of the printing element substrate 80*a*. FIG. 8B is a schematic cross-sectional view along section line VIIIB-VIIIB in FIG. 8A. The printing element substrate 80*a* is provided with pressure chambers 85 filled with ink and ejection openings 86 for ejecting ink. In each pressure chamber 85, a printing element 84 is provided in a position facing the ejection opening 86. The printing element substrate 80*a* is also provided with a plurality of individual supply flow paths 88 connected to the common supply flow path 80*b* and a plurality of individual collection flow path 89 connected to the common collection flow path 80*c* for the respective ejection openings 86.

The configuration described above produces such a flow that ink flows from the common supply flow path 80*b* with relatively weak negative pressure to the common collection flow path 80*c* with relatively strong negative pressure in the printing element substrate 80*a*. More specifically, ink flows in the order of the common supply flow path 80*b*, the individual supply flow path 88, the pressure chamber 85, the individual collection flow path 89, and the common collection flow path 80*c*. In a case where ink is ejected by the printing element 84, ink moving from the common supply flow path 80*b* to the common collection flow path 80*c* is partly discharged to the outside of the print head 8 by being ejected from the ejection opening 86. On the other hand, ink that has not been ejected from the ejection opening 86 is collected to the collection flow path C4 through the common collection flow path 80*c*.

In the case of performing print operation with the configuration described above, the ink supply control unit 209 closes the tank supply valve V1 and the head replacement valve V5, opens the air release valve V0, the supply valve V2, and the collection valve V4, and drives the supply pump P1 and the collection pump P2. This establishes a circulation path in the order of the sub-tank 151, the supply flow path C2, the print head 8, the collection flow path C4, and the sub-tank 151. In a case where the amount of ink supplied from the supply pump P1 per unit time is greater than the sum total of the amount of ejection of the print head 8 per unit time and the amount of ink flowing through the collection pump P2 per unit time, ink flows from the supply flow path C2 into the relief flow path C3. This adjusts the amount of ink flowing from the supply flow path C2 into the print head 8.

In a case where print operation is not performed, the ink supply control unit 209 stops the supply pump P1 and the collection pump P2 and closes the air release valve V0, the supply valve V2, and the collection valve V4. This stops the ink flow in the print head 8 and prevents backflow caused by a water head difference between the sub-tank 151 and the print head 8. In addition, ink leakage and evaporation from the sub-tank 151 are suppressed by closing the air release valve V0.

In the case of collecting ink from the print head 8, the ink supply control unit 209 closes the air release valve V0, the tank supply valve V1, the supply valve V2, and the collection valve V4, opens the head replacement valve V5, and drives the decompression pump P0. This makes the pressure inside the sub-tank 151 negative, whereby ink is collected from the print head 8 to the sub-tank 151 through the head replacement flow path C5. In this manner, the head replacement valve V5 is closed during normal print operation and standby and is open in the case of collecting ink from the print head 8. It should be noted that the head replacement valve V5 is open also in the case of filling the head replacement flow path C5 with ink along with the filling of the print head 8.

In the circulation flow path of the present embodiment, ink flows through a flow path passing through the pressure chamber 85. However, the flow path does not necessarily pass through the pressure chamber 85. For example, ink may flow from the supply flow path 80*b* to the collection flow path 80*c*.

(Detection Process of Ink Ejection State)

In the present embodiment, an ink ejection state is detected by using a temperature detection element 91 provided in the printing element substrate 80*a* of the print head 8.

Figure 9A:
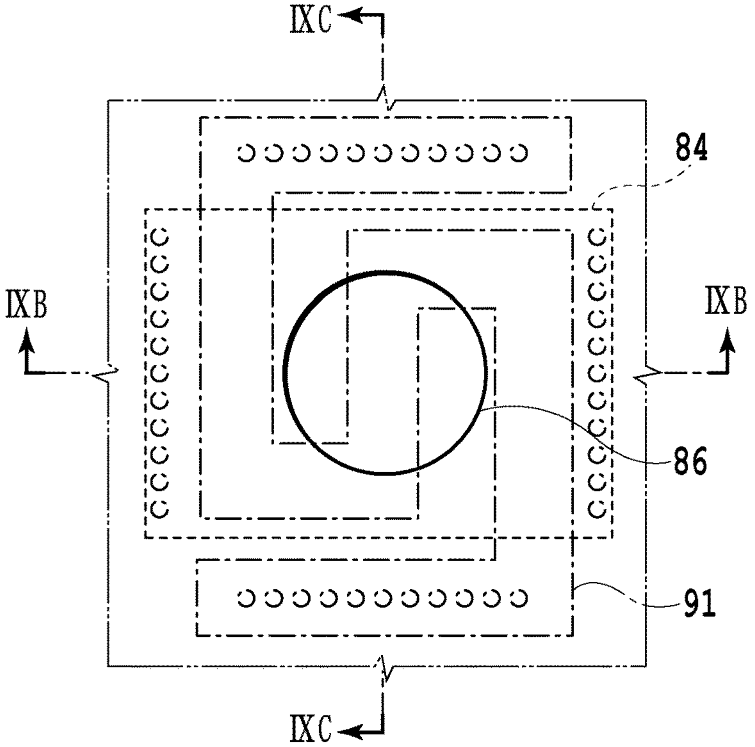
FIG. 9A is an enlarged view of part of the printing element substrate.
Figure 9B:
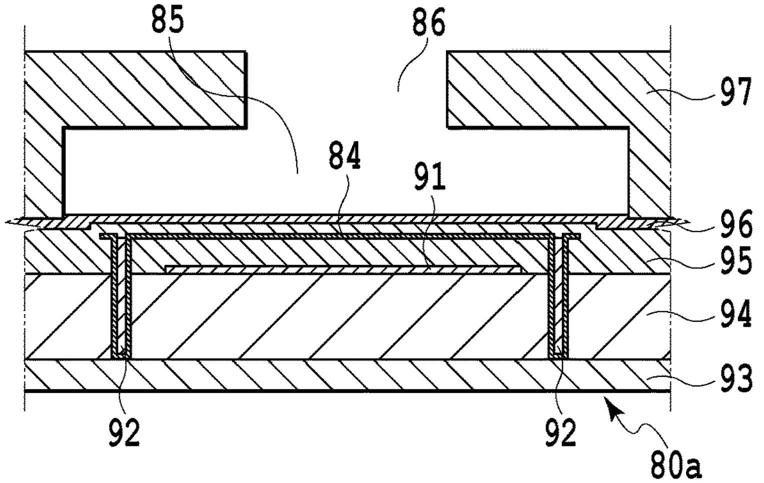
FIG. 9B is a cross-sectional view along line IXB-IXB in FIG. 9A.
Figure 9C:
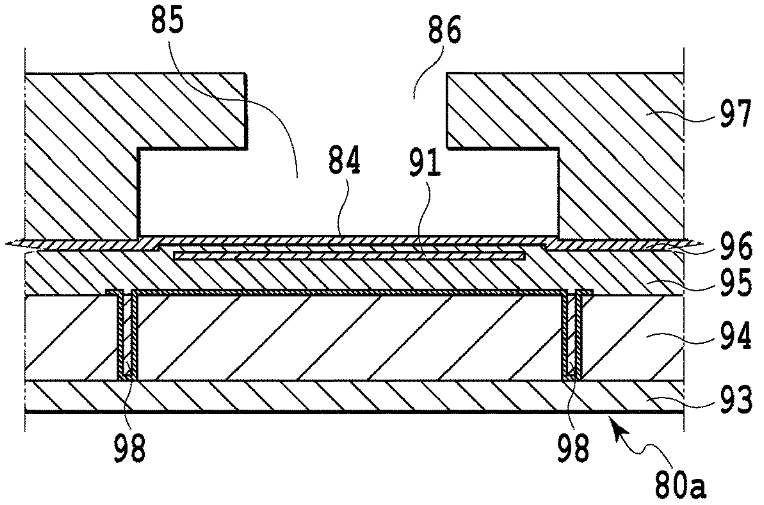
FIG. 9C is a cross-sectional view along line IXC-IXC in FIG. 9A.

FIG. 9A is a diagram showing the printing element 84 and the temperature detection element 91 provided corresponding to the ejection opening 86 in the printing element substrate 80*a*. FIG. 9B is a cross-sectional view along line IXB-IXB in FIG. 9A. FIG. 9C is a cross-sectional view along line IXC-IXC in FIG. 9A. The printing element 84 is an ejection energy generation element configured to generate ejection energy for ink ejection. The printing element 84 in this embodiment is an electrothermal transducing element (heating resistance element) formed of a tantalum silicon nitride film or the like and is connected to wiring 93 of the printing element substrate 80*a* via a conductive plug 92 formed of tungsten or the like. A drive pulse is applied to the printing element 84, thereby generating heat and foaming ink inside the pressure chamber 85. The foaming energy is used to eject ink from the pressure chamber 85 through the ejection opening 86. The temperature detection element 91 in this embodiment is a thin film resistor formed of titanium, titanium nitride laminated film and the like and is connected to the wiring 93 via a conductive plug 98 formed of tungsten or the like. The printing element substrate 80*a* is provided with an interlayer insulating film 94, a protective film 95, and a cavitation resistant film 96. The printing element substrate 80*a* is provided with an ejection opening forming member 97 for forming the ejection openings 86.

The temperature of the printing element 84 mounted on the printing element substrate 80*a* is detected by using the print controller 202, the head I/F 206 connected to the print head 8, and the RAM 204. The head I/F 206 comprises a signal generation unit configured to generate various signals to be transmitted to the printing element substrate 80*a* and a determination result extraction unit configured to input a determination result signal RSLT output from the printing element substrate 80*a* based on temperature information detected by the temperature detection element 91. In a case where the print controller 202 issues an instruction to the signal generation unit for temperature detection, the signal generation unit outputs a signal to the printing element substrate 80*a*. The signal includes a clock signal CLK, a latch signal LT, a block signal BLE, a print data signal DATA, a heat enable signal HE, and an ejection inspection threshold signal Ddth. The ejection inspection threshold signal Ddth can set thresholds for printing element groups obtained by dividing a plurality of printing elements mounted on the print head 8 into a plurality of groups each including a plurality of printing elements positioned close to each other, and the set values can be changed in a cycle of one column. The configuration capable of setting an ejection inspection threshold voltage (Th) for each group will be described.

Figure 10:
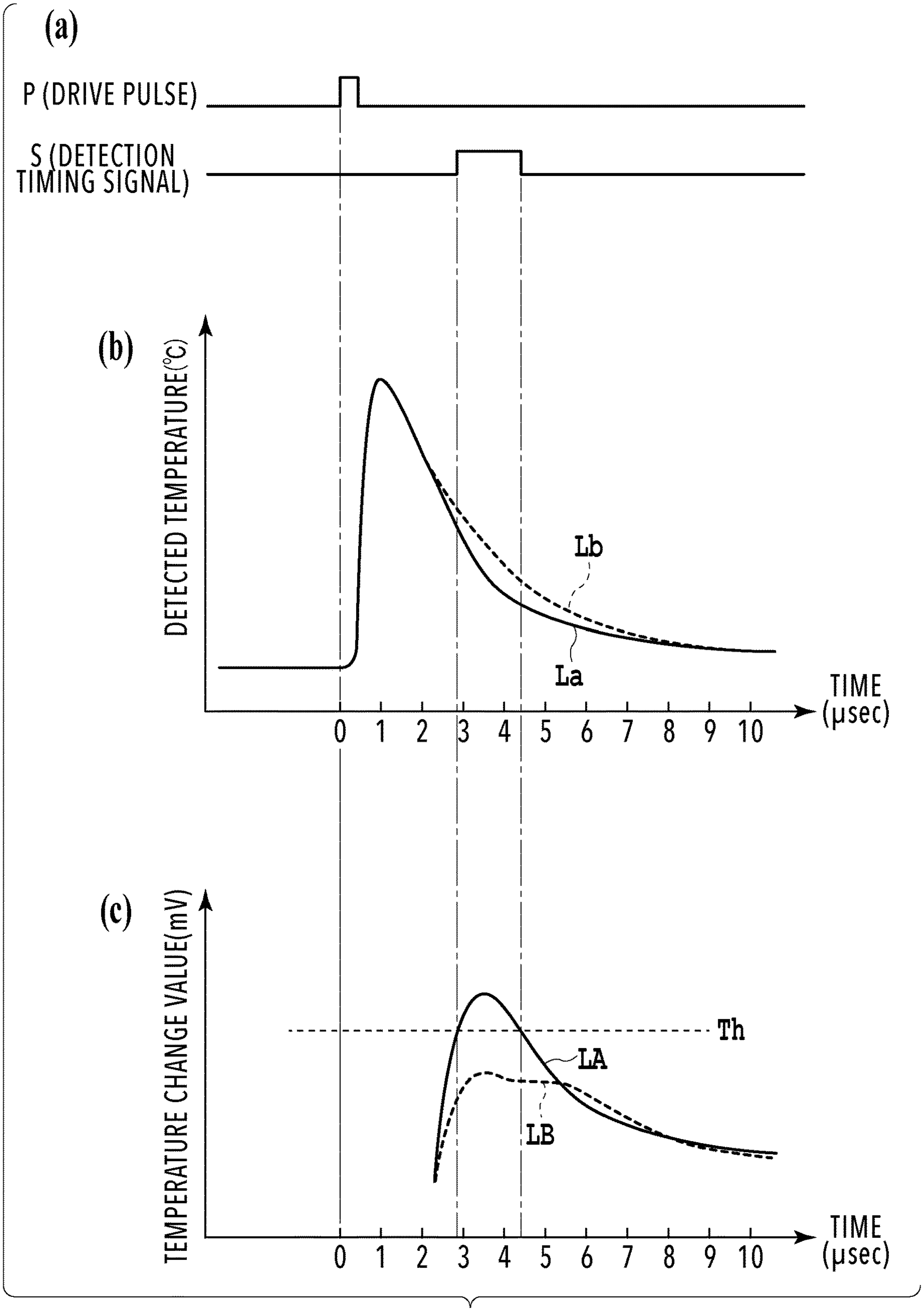
FIG. 10 is a diagram showing a temperature detected by a temperature detection element.

FIG. 10 is a diagram showing a temperature detected by the temperature detection element 91 in the case of applying a drive pulse P to the printing element 84. The drive pulse P shown in section (a) of FIG. 10 is applied, whereby the printing element 84 generates heat and the foaming energy of ink ejects ink from the ejection opening 86. The temperature detected by the temperature detection element 91 changes as shown by solid curve La in section (b) of FIG. 10 in a case where ink is normally ejected, and changes as shown by dashed curve Lb in section (b) of FIG. 10 in a case where an ink ejection failure occurs. In a case where ink is normally ejected, some of ink droplets ejected from the ejection opening 86 fall on the upper part of the printing element 84 and cool the printing element 84. As a result, the temperature near the printing element 84 rapidly declines as shown by curve La, whereby the temperature detected by the temperature detection element 91 also rapidly declines. On the other hand, in a case where an ink ejection failure occurs, since such cooling by a fall of some of ink droplets does not occur, the temperature detected by the temperature detection element 91 gradually declines as shown by curve Lb.

Section (c) of FIG. 10 is a graph showing temperature change values obtained by differentiation of the temperature changes shown by curves La and Lb, comparing the temperature change values at a timing set by the detection timing signal S shown in section (a) of FIG. 10 with a predetermined threshold Th. In section (c) of FIG. 10, the temperature change value shown by solid curve LA is a derivative value of curve La and the temperature change value shown by dashed curve LB is a derivative value of curve Lb. At the timing set by the detection timing signal S, the temperature change value shown by curve LA exceeds the threshold Th and the temperature change value shown by curve LB does not exceed the threshold Th. In the case of exceeding the threshold Th like curve LA, the excess over the threshold is expressed by the determination result signal RSLT from the printing element substrate 80*a*. The signal is input to the determination result extraction unit and stored in the RAM 204. As described above, the ink ejection state can be detected based on whether a derivative value of the temperature detected by the temperature detection element 91 exceeds the threshold Th.

The ink ejection state can be detected also by the following method: while ejecting ink from all the ejection openings of the print head 8, flying ink immediately after ejection is optically scanned by an apparatus configured to optically detect ejected ink. This method uses an optical scan unit comprising a light emitter and a light receiver. The optical scan unit carries out a scan such that a light axis formed between the light emitter and the light receiver passes through a flying path of ejected ink. In a case where ink is ejected, light from the light emitter is cut off and the amount of light received by the light receiver decreases. Detecting this phenomenon of the light receiving amount enables detection of the ink ejection state.

(Ink Circulation Process)

As described above, in the present embodiment, ink is circulated through the pressure chamber of the print head 8. This ink circulation can recover the ink ejection state in the print head 8. For example, the ink ejection state can be recovered to a normal state in a case where an ink ejection failure occurs due to ink thickening near an ejection opening caused by moisture evaporation from ink. Accordingly, circulation operation for circulating ink is a kind of recovery operation for maintaining a good ink ejection state in the print head 8.

Figure 11A:
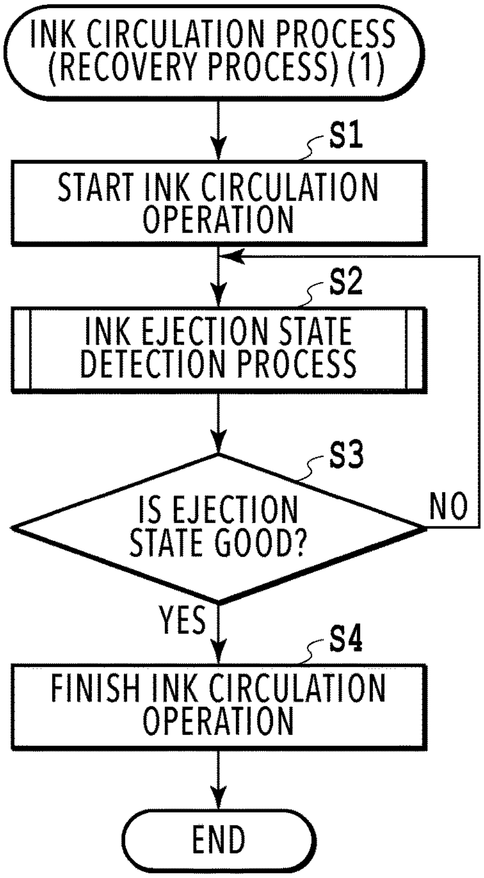
FIG. 11A and FIG. 11B are flowcharts showing an ink circulation process (1) and an ink circulation process (2) in a first embodiment of the present invention.
Figure 11B:
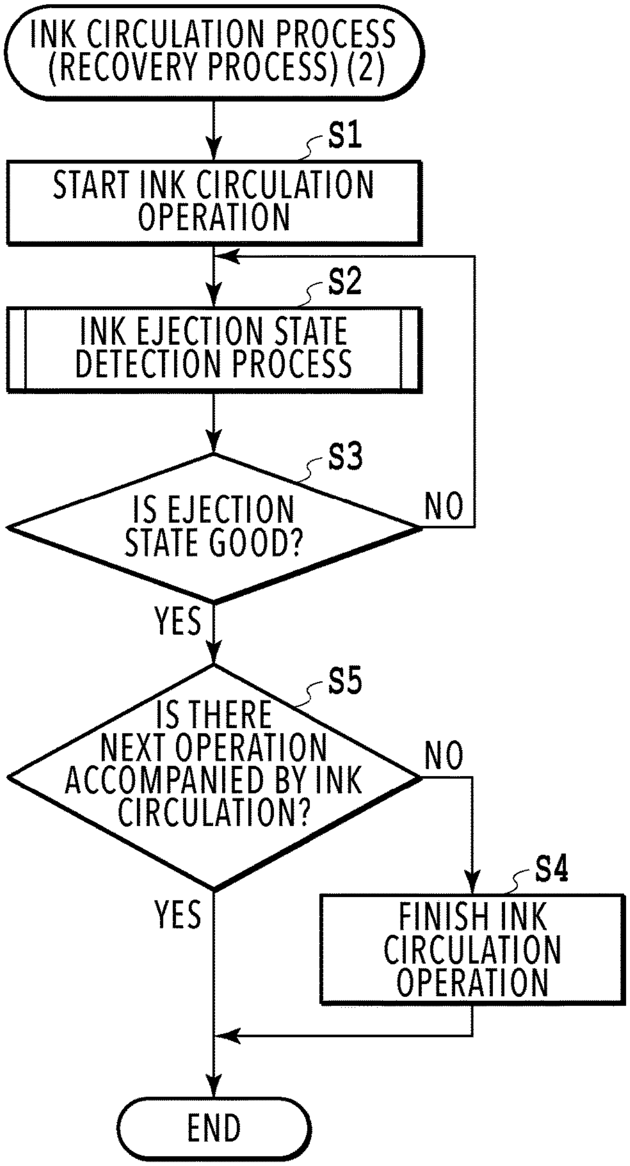

FIG. 11A and FIG. 11B are flowcharts showing an ink circulation process performed as a recovery process, in which ink circulation operation and detection operation in an ink ejection state detection process are simultaneously performed. This can reduce total time required for the recovery process and the detection process.

The circulation process is performed upon power-on of the printing apparatus or input of a print instruction. In the present embodiment, the circulation process is performed upon input of a print instruction. In a case where a print job is input from the host apparatus 400 to the main controller 101 or a print instruction is input from the operation panel 104 to the main controller 101, the main controller 101 instructs the print controller 202 to perform the circulation process. Upon receipt of the instruction, the print controller 202 controls the print head 8 via the ink supply control unit 209 and the head I/F 206 to perform the circulation process. In addition to the above, the method of the embodiment described below is applicable to a circulation process in the case of performing the circulation process regularly at predetermined timings, or in the case of error occurrence or a maintenance instruction from a user.

In the examples shown by FIG. 11A and FIG. 11B, the detection result of the ink ejection state detection process described above is used to determine the timing of finishing the circulation process. The ink circulation processes in FIG. 11A and FIG. 11B are performed under control of the main controller 101 of the controller unit 100 or the print controller 202 of the print engine unit 200. In a case where the main controller 101 receives the print instruction, the print controller 202 of the print engine unit 200 determines to perform either of the circulation processes (1) and (2) described below as a preparation to printing, thereby determining to start the ink circulation operation. Along with the execution of the circulation operation, it is also determined to perform the detection process accompanied by ink ejection operation to be described later. “S” in FIG. 11A and FIG. 11B indicates a step in the process.

In the ink circulation process (1) in FIG. 11A, the ink circulation operation is first started (S1) and the detection processing accompanied by ink ejection operation described above is then performed (S2). Based on the detection result, it is determined whether the ink ejection state in the print head is good as will be described later (S3). The detection process is temporarily finished in this determination, but the process returns to S2 in a case where the state is not determined to be good. Although the details of the determination will be described later, the basic idea is as follows: for example, the ejection state is determined to be good in a case where the number of inoperative ejection openings is equal to or less than a first number defined by a predetermined condition, and the ejection state is determined to be not good in a case where the number of inoperative ejection openings is greater than the first number. The ink circulation operation is continued until the ink ejection state in the print head is determined to be good by the determination performed multiple times along with the repetition of the detection process. In a case where the ink ejection state in the print head is determined to be good, the ink circulation operation is finished (S4) and the ink circulation process (1) is finished.

Like the circulation process (1), the ink circulation process (2) of FIG. 11B determines whether the ink ejection state is good, as will be described later, based on the detection result of the ink ejection state detection process in the print head (S3). The ink circulation operation is continued until the ink ejection state in the print head is determined to be good. In a case where the ejection state is determined to be good, it is determined whether there is the next operation accompanied by ink circulation (S5). If there is no next operation accompanied by ink circulation, the ink circulation operation is finished (S4) and the ink circulation process (2) is finished. If there is the next operation accompanied by ink circulation, the process of FIG. 11B is finished to transition to a process for performing the next operation accompanied by ink circulation. At this time, ink circulation is continued. In this embodiment, the next operation accompanied by ink circulation includes print operation. That is, the ink ejection state detection process is performed simultaneously with ink circulation performed at the run-up to the print operation, for example, at the preparation stage of the print operation, and transitions to the print operation while continuing the ink circulation.

(Determination Method of Ink Ejection State in Print Head)

As a method of determining whether the ink ejection state of the print head is good in S3 of FIG. 11A and FIG. 11B, for example, the first, second, and third determination methods described below can be used.

(First Determination Method)

The first determination method determines whether the ink ejection state in the entire print head 8 is good based on the number of ejection openings where an ink ejection failure has occurred. For example, it is assumed that the print head 8 comprises 15 chips corresponding to the printing element substrates 80*a* in series, each chip comprising nozzles capable of ejecting inks of five colors, 1,024 nozzles for each ink color. The inks of five colors are black inks (K1, K2), a cyan ink (C), a magenta ink (M), and a yellow ink (Y). Each nozzle includes the printing element 84, the pressure chamber 85, the ejection opening 86 and the like. The total number of nozzles in this print head is 76,800 (5×1,024×15).

As shown in FIG. 12A, a threshold of the number of nozzles where an ink ejection failure has occurred (inoperative nozzles) is set for each ink color. The number of detected inoperative nozzles is compared with the corresponding threshold for each ink color. In a case where the numbers of detected inoperative nozzles for all the ink colors are equal to or less than the corresponding thresholds, the entire print head is determined to be in a good ejection state. In a case where the number of detected inoperative nozzles for at least one ink color exceeds the corresponding threshold, the ejection state of the entire print head is determined to be not good. Since the black inks are conspicuous on the occurrence of a nozzle ejection failure, the threshold for the black inks is set at a relatively small value. Since the yellow ink is inconspicuous on the occurrence of a nozzle ejection failure, the threshold for the yellow ink is set at a relatively large value.

In addition to the thresholds for the respective ink colors, a threshold for all the ink colors is set. Even though the numbers are less than the thresholds for the respective ink colors, the ejection state is determined to be not good in a case where the total number of inoperative nozzles for all the ink colors exceeds the threshold.

As shown in FIG. 12B, the ratio of the number of inoperative nozzles for each ink color to the total number of nozzles may be set as a threshold. In this case, the entire print head is determined to be in a good ejection state in a case where all the ratios of the numbers of detected inoperative nozzles for the respective ink colors are equal to or less than the corresponding thresholds. The ejection state of the entire print head is determined to be not good in a case where the ratio of the number of detected inoperative nozzles for at least one or all of the ink colors exceeds the corresponding threshold.

(Second Determination Method)

The second determination method determines whether the ink ejection state of the entire print head 8 is normal based on the number of inoperative nozzles on each chip in the print head 8. Like the first determination method described above, it is assumed that the print head 8 comprises 15 chips corresponding to the printing element substrates 80*a* in series, each chip comprising nozzles capable of ejecting inks of five colors, 1,024 nozzles for each ink color.

As shown in FIG. 13A, a threshold of the total number of inoperative nozzles for the inks of five colors is set for each of the 15 chips from the 0-th to 14-th chips. The total number of detected inoperative nozzles for the inks of five colors is compared with the corresponding threshold for each chip. In a case where all the total numbers of detected inoperative nozzles are equal to or less than the corresponding thresholds in all the chips, the entire print head is determined to be in a good ejection state. In a case where the total number of detected inoperative nozzles exceeds the corresponding threshold in at least one chip, the ejection state of the entire print head is determined to be not good. Since a change in a printed image is conspicuous on the occurrence of a nozzle ejection failure on chips located in the center, a threshold for chips located in the center is set at a relatively small value. Since a change in a printed image is inconspicuous on the occurrence of a nozzle ejection failure on chips located on both sides, a threshold for chips located on both sides is set at a relatively large value.

As shown in FIG. 13B, a threshold may be set for each ink color in each chip. In a case where all the numbers of detected inoperative nozzles for the respective ink colors are equal to or less than the corresponding thresholds for the respective ink colors in all the chips, the entire print head is determined to be in a good ejection state. In a case where at least one of the numbers of detected inoperative nozzles for the respective ink colors exceeds the corresponding threshold in at least one chip, the ejection state of the entire print head is determined to be not good.

(Third Determination Method)

The third determination method determines whether the ink ejection state of the entire print head 8 is normal based on the number of inoperative nozzles newly detected excluding nozzles prestored as inoperative nozzles.

A main factor of occurrence of an ink ejection failure state recoverable by the ink circulation operation is sticking of thickened ink to the ejection opening or the like. However, there is a possibility that a nozzle determined to be an inoperative nozzle in the previous detection process (inoperative determination nozzle) cannot be recovered by the ink circulation operation because of factors such as a nozzle failure and clogging of an ejection opening caused by foreign matter such as dust. In the third determination method, the unrecoverable inoperative determination nozzle is prestored and excluded from the target of determination whether the ink ejection state of the entire print head is good. This can reduce time required for the ink circulation process during which printing cannot be performed by the printing apparatus. The controller unit 100 or the print engine unit 200 has the function for storing the inoperative determination nozzle unrecoverable by the ink circulation operation in the ROM 107.

FIG. 14 is a table showing a specific example of the third determination method, where the number of nozzles for each ink color is ten (nozzle numbers 0 to 9) for the sake of convenience. The threshold for each ink color is set at 15%, which is the ratio of the number of inoperative nozzles to the total number of nozzles. Nozzles for the black ink K1 include one inoperative determination nozzle, and two inoperative nozzles including the inoperative determination nozzle are currently detected. Accordingly, the number of determination target nozzles is "9" obtained by subtracting "1," the number of inoperative determination nozzles from "10" the total number of nozzles. The number of detected inoperative nozzles is "1". As a result, the ratio of inoperative nozzles is 11%, which is less than the threshold 15%. Accordingly, the ink ejection state is determined to be good "OK" for the nozzles for the black ink K1.

Nozzles for the black ink K2 includes one inoperative determination nozzle, and two inoperative nozzles not including the inoperative determination nozzle are currently detected. Accordingly, the number of determination target nozzles is "9" and the number of detected inoperative nozzles is "2", As a result, the ratio of inoperative nozzles is 22%, which exceeds the threshold 15%. Accordingly, the ink ejection state is determined to be not good "NG" for the nozzles for the black ink K2. The ink ejection state is determined to be good "OK" for the nozzles for the inks C, M, and Y.

In the case of FIG. 14, since the ink ejection state for the nozzles for the black ink K2 is determined to be not good "NG", the ink ejection state of the entire print head is determined to be not good.

Second Embodiment

In the present embodiment, the ink circulation process is performed after bringing the atmosphere around the ejection openings of the print head 8 into a wet state.

Figure 15:
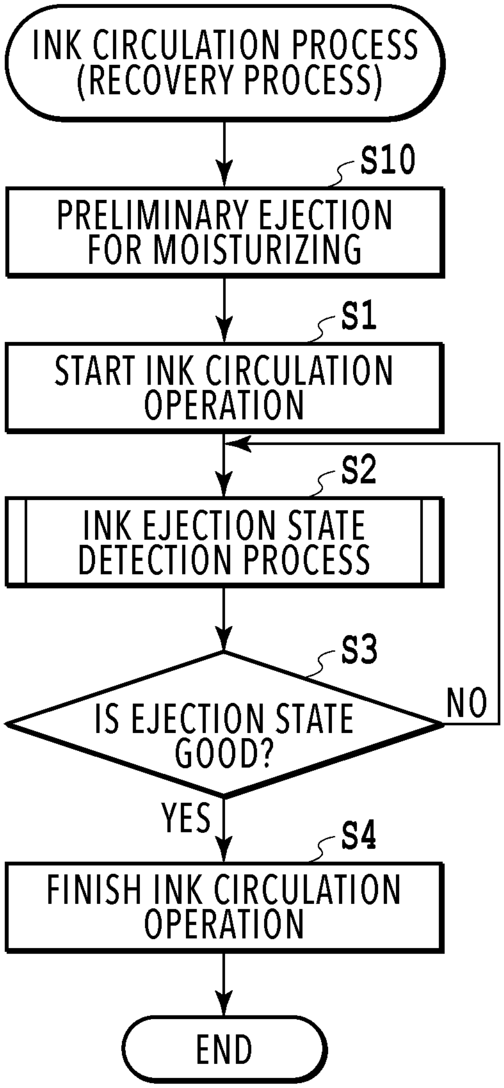
FIG. 15 is a flowchart showing an ink circulation process in a second embodiment of the present invention.

FIG. 15 is a flowchart showing the ink circulation process in the present embodiment. The same steps as those in FIG. 11 described above are assigned with the same reference numerals and the description is omitted. In the present embodiment, before the start of the ink circulation process (S1), preliminary ejection is performed for bringing the inside of the cap member 10*a* capable of intimately contacting the ejection opening surface 8*a* of the print head 8 and the atmosphere around the ejection openings of the print head 8 into a wet state (S10). That is, ink is ejected into the cap member 10*a* of the cap unit 10, the inside of the cap member 10*a* is moisturized, and the cap member 10*a* is brought into intimate contact with the ejection opening surface 8*a* of the print head 8 (capped). In this manner, the atmosphere around the ejection openings is moisturized by using the cap member 10*a* capable of capping, thereby facilitating resolution of sticking of thickened ink in the ejection openings and the like. As a result, it is possible to increase the recovery effect of the ejection state of the print head by the ink circulation operation.

In the preliminary ejection for moisturizing (S10), it is preferable to eject the color inks (C, M, Y) relatively less prone to stick than the black inks (K). This is to reduce the possibility of an ejection failure of ink for moisturizing caused by an ink prone to stick. The ink circulation process in FIG. 15 can be performed with the cap member 10*a* in intimate contact with the ejection opening surface 8*a* of the print head 8 (cap close state). Accordingly, ink can be supplied to an airtight space in the cap member 10*a* in the cap close state by the preliminary ejection for moisturizing and the effect of moisturizing the atmosphere around the ejection openings can be improved. It is also possible to supply ink into the cap member 10*a* by the preliminary ejection for moisturizing with the cap member 10*a* separated from the ejection opening surface 8*a* of the print head 8 (cap open state) and perform the ink circulation process in FIG. 15 in the cap open state. In this case, in a case where ink is ejected in the preliminary ejection for moisturizing (S10) and the detection process (S2), the possibility that the ink bounces off the inside of the cap member 10*a* and adheres to the ejection opening surface 8*a* can be reduced. Even in the cap open state, the preliminary ejection for moisturizing has the atmosphere moisturizing effect on up to the peripheral space including space above the cap. The cap close state may be brought about after the preliminary ejection for moisturizing.

Third Embodiment

In the present embodiment, a timing for performing the ink ejection state detection process is set.

Figure 16:
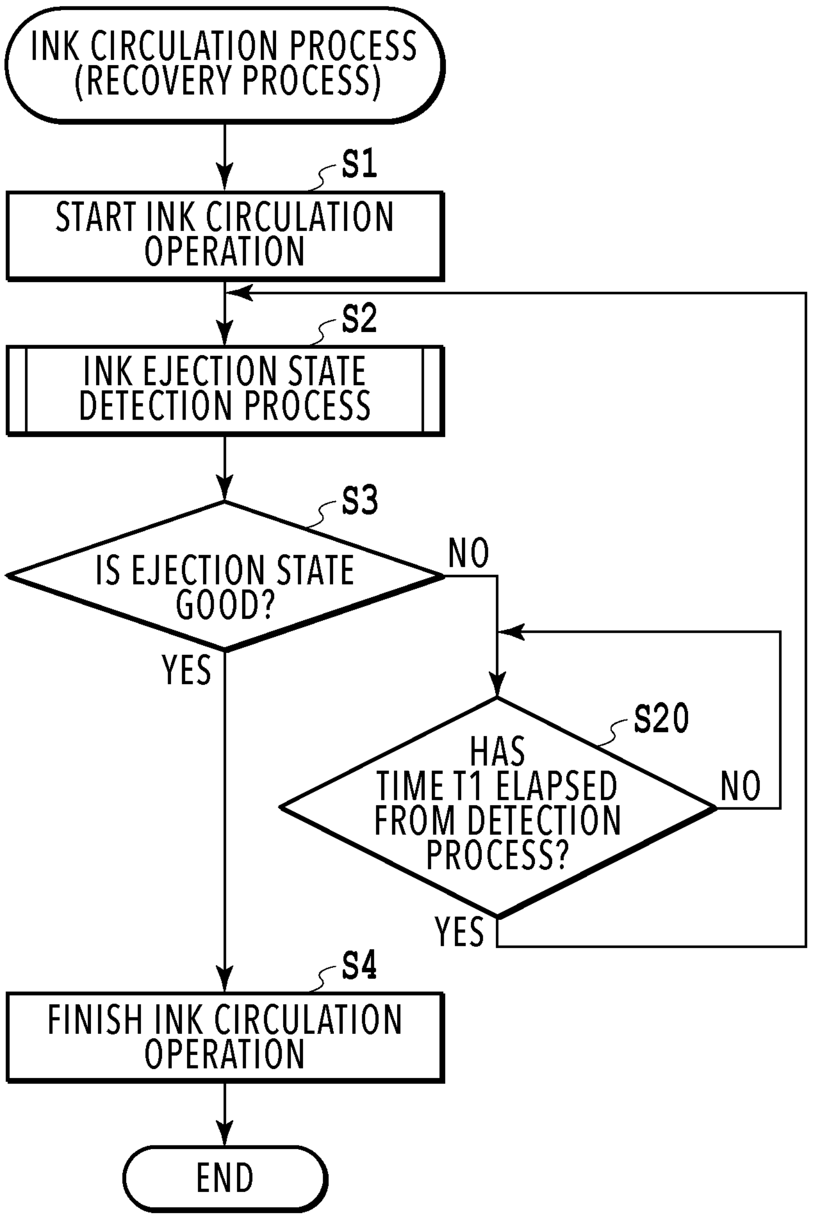
FIG. 16 is a flowchart showing an ink circulation process in a third embodiment of the present invention.

FIG. 16 is a flowchart showing an ink circulation process in the present embodiment. The same steps as those in FIG. 11 described above are assigned with the same reference numerals and the description is omitted. In the present embodiment, in a case where the ink ejection state detection process (S2) determines that the ink ejection state is not good, the process transitions from S3 to S20 to determine whether a time elapsed from the execution of the detection process (S2) is equal to or greater than a predetermined time T1. In a case where the elapsed time is equal to or greater than the time T1, the detection process (S2) is performed again. The time T1 can be set according to various conditions. For example, in a case where it is necessary to immediately perform the next operation of the ink circulation process of FIG. 16, the time T1 is set relatively short. This makes it possible to perform the next operation quickly after the completion of recovery by repeating the detection process (S2) accompanied by ink ejection within a short time and detecting the recovery condition of the ink ejection state frequently. In a case where it is assumed that the degree of sticking of thickened ink around the ejection openings or the like is low and the amount of ink adhering to the ejection opening surface 8*a* is small, the time T1 is set relatively short. On the other hand, in a case where it is assumed that the degree of sticking of thickened ink around the ejection openings or the like is high and the amount of ink adhering to the ejection opening surface 8*a* is large, the time T1 is set relatively long. This can suppress the consumption of ink ejected during the detection process (S2) and the power consumption during the detection process (S2).

Fourth Embodiment

In the present embodiment, the timing of performing the ink ejection state detection process is set based on the start time of the ink circulation process.

Figure 17:
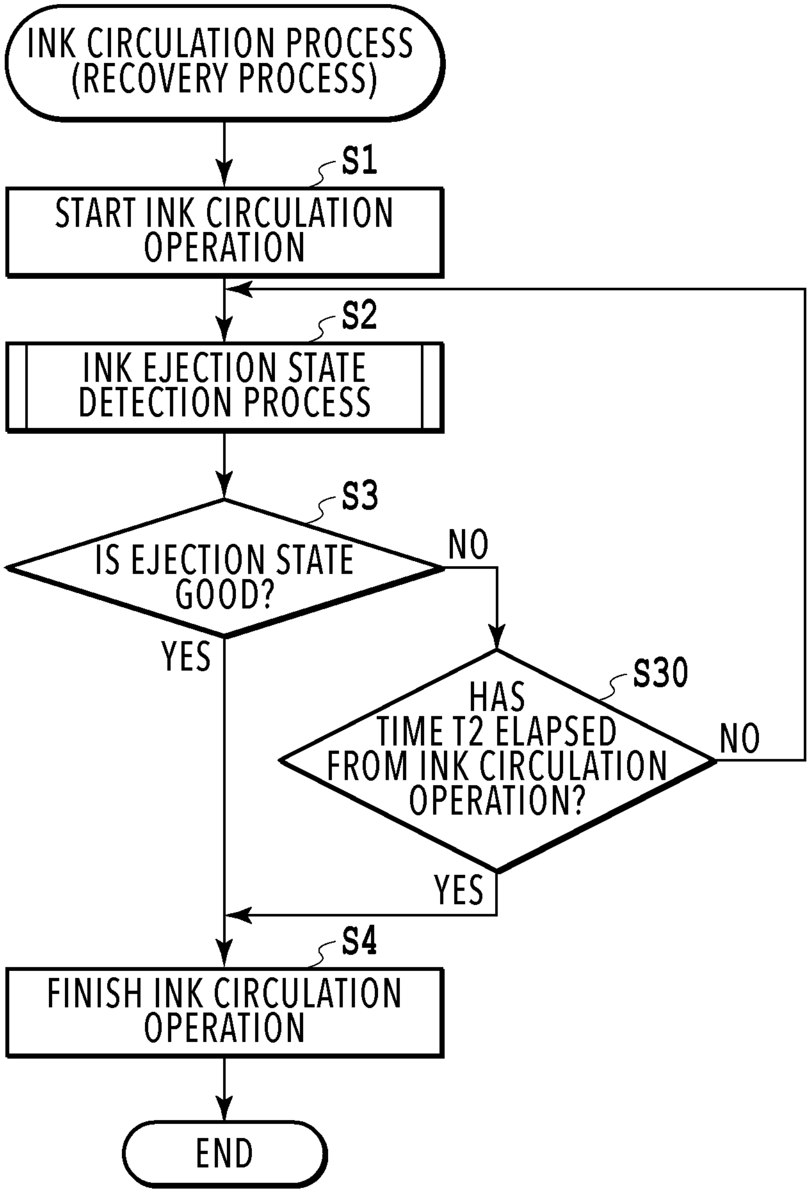
FIG. 17 is a flowchart showing an ink circulation process in a fourth embodiment of the present invention.

FIG. 17 is a flowchart showing an ink circulation process in the present embodiment. The same steps as those in FIG. 11A and FIG. 11B described above are assigned with the same reference numerals and the description is omitted. In the present embodiment, in a case where the ink ejection state detection process (S2) determines that the ink ejection state is not good, the process transitions from S3 to S30 to determine whether a time elapsed from the start of the ink circulation operation (S1) is equal to or greater than a predetermined time T2. In a case where the elapsed time is less than the time T2, the detection process (S2) is performed again. In a case where the elapsed time is equal to or greater than the time T2, the circulation process of FIG. 17 is finished. That is, in a case where the ink ejection state is not determined to be good within a predetermined time, the circulation process of FIG. 17 is finished. In this manner, by setting the upper limit of the time for the ink circulation process, the circulation process of FIG. 17 can be finished even in the case of an inoperative nozzle unrecoverable by the ink circulation operation due to, for example, a heater failure.

Fifth Embodiment

In the present embodiment, the ink ejection state detection process is repeated a predetermined number of times even in a case where the ink ejection state is determined to be good.

Figure 18:
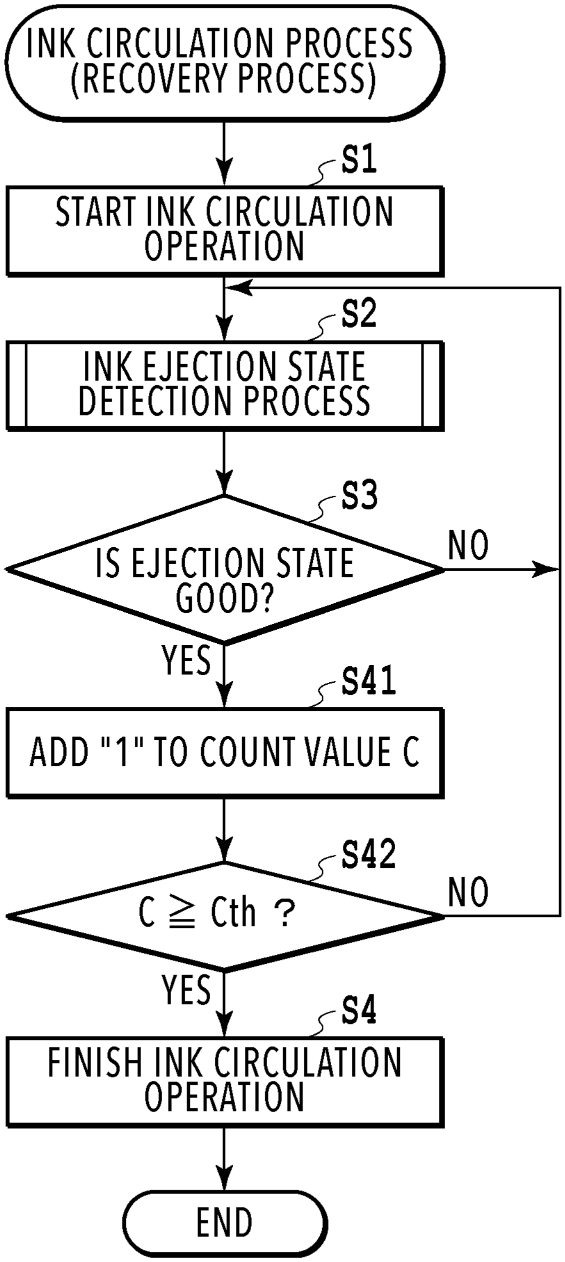
FIG. 18 is a flowchart showing an ink circulation process in a fifth embodiment of the present invention.

FIG. 18 is a flowchart showing an ink circulation process in the present embodiment. The same steps as those in FIG. 11A and FIG. 11B described above are assigned with the same reference numerals and the description is omitted. In the present embodiment, in a case where the ink ejection state detection process (S2) determines that the ink ejection state is good, the process transitions from S3 to S41 to add "1" to a count value C. The count value C is reset to "0" before the execution of the detection process (S2). The count value C is compared with a predetermined threshold Cth (S42), the detection process (S2) is repeated until the count value C reaches the threshold Nth, and the circulation process in FIG. 17 is finished in a case where the count value C reaches the threshold Nth.

For example, even in a case where thickened ink around the ejection openings cannot completely be removed by the ink circulation operation, ink may be ejected and the detection process may determine that the ink ejection state is good. In this case, there is a possibility that the ink ejection state becomes not good even by a slight progression of ink thickening until the next print operation. In the present embodiment, even in a case where the ink ejection state is determined to be good, the ink ejection state detection process is repeated a predetermined number of times or more, thereby recovering the ink ejection state more reliably.

Sixth Embodiment

In the present embodiment, the ink ejection state detection process is performed only for a specific ink.

Figure 19A:
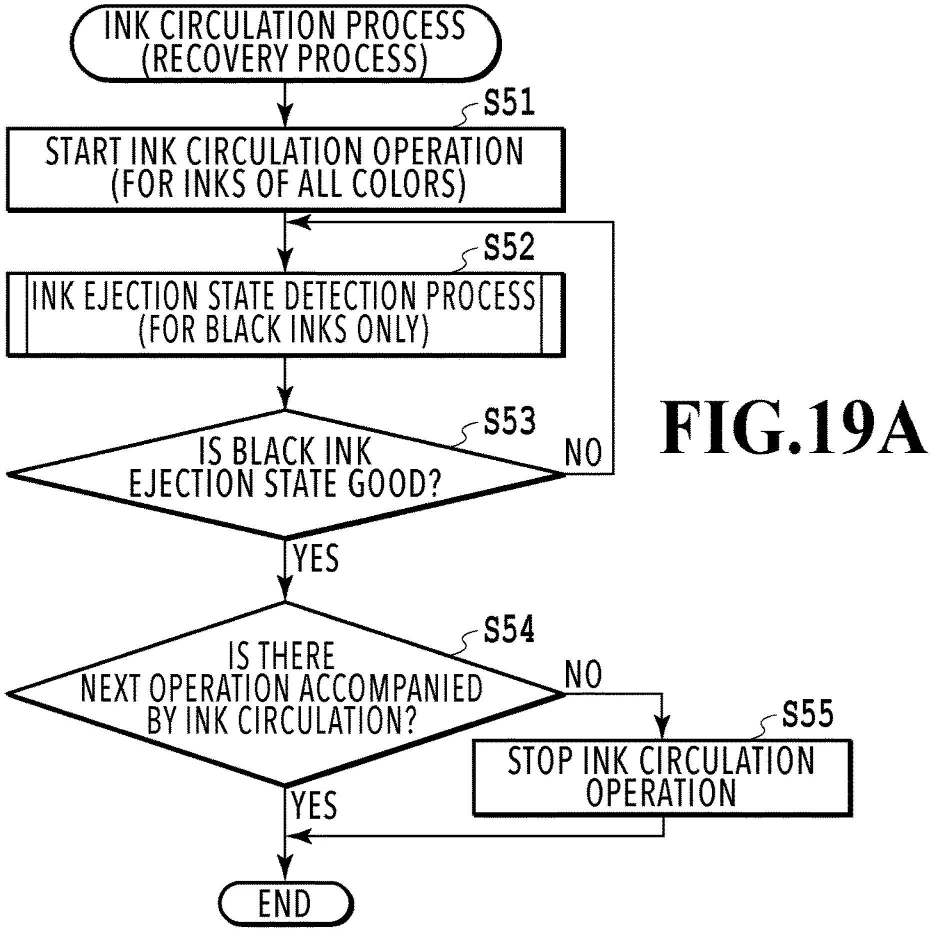
FIG. 19A is a flowchart showing an ink circulation process in a sixth embodiment of the present invention and FIG. 19B is a graph showing an example of the progression of the number of inoperative nozzles in execution of circulation operation.

FIG. 19A is a flowchart showing an ink circulation process in the present embodiment. First, the circulation operation for circulating the inks of all colors is started (S51) and the above-described detection process accompanied by ink ejection operation is then performed only for the black inks (S52). Based on the detection result, it is determined whether the black ink ejection state is good (S53). For example, in a case where the ratio of the number of inoperative nozzles to the total number of nozzles for the black inks is equal to or less than 0.4%, the ink ejection state of the entire print head is determined to be good. In this manner, the ink circulation operation for all colors is continued until the black ink ejection state is determined to be good. In a case where the black ink ejection state is determined to be good, the ink circulation operation for all colors is finished (S54).

Figure 19B:
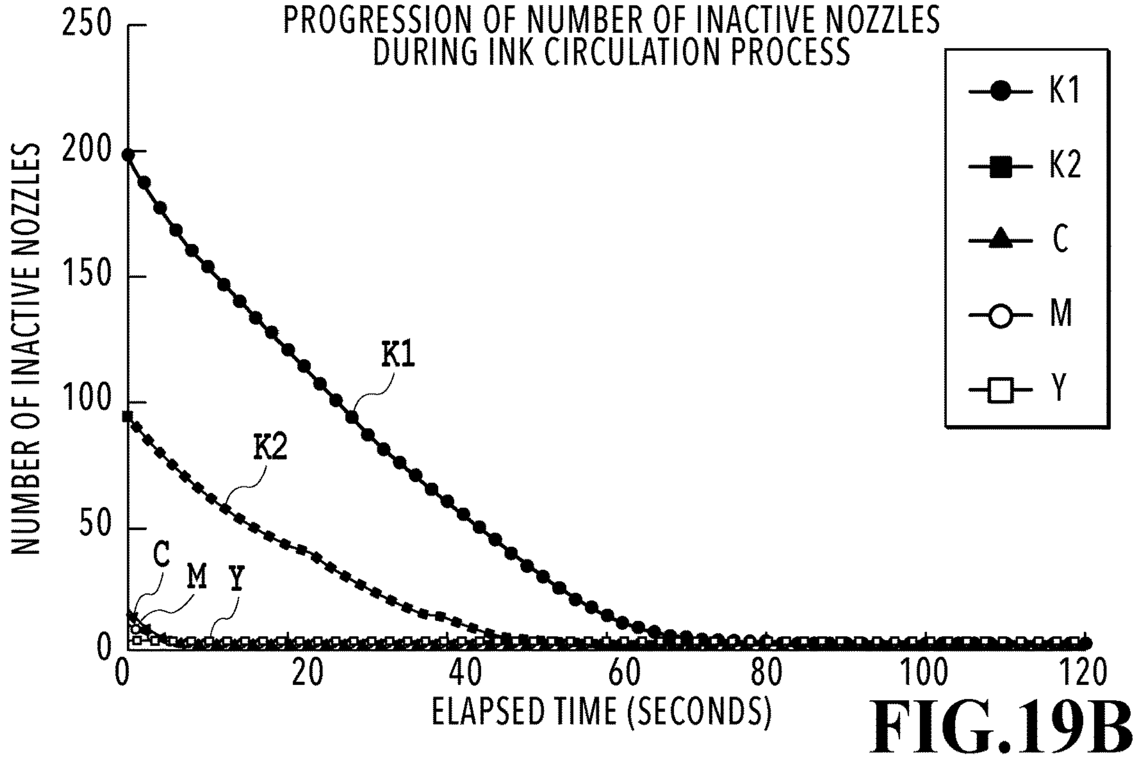

FIG. 19B is a graph showing an example of the progression of the number of inoperative nozzles for each ink color in execution of the ink circulation process. As is clear from the graph, since the black inks (K1, K2) are prone to be thickened when exposed to air as compared with the color inks (C, M, Y), a time required for recovering inoperative nozzles for the black inks to a good ejection state is often longer than that for the color inks. Accordingly, there is a high probability that inoperative nozzles for the color inks are brought into a good ejection state by performing the ink circulation operation until inoperative nozzles for the black inks are determined to be in a good ejection state. From this viewpoint, in the present embodiment, the target of the circulation operation is the inks of all colors and the target of the ejection state detection process is only the black inks. This can suppress the amount of ink ejection and the power consumption during the ejection state detection process. In this manner, among a plurality of inks having different thickening properties, an ink having a relatively high thickening property and prone to stick such as a black ink is determined to be a target of the ejection state detection process.

Alternatively, the target of the circulation operation may be all nozzles in the print head and the target of the ejection state detection process may be only a specific nozzle. In other words, the target of the ejection state detection process may be specified in a unit of a nozzle. As the target of the detection process, it is preferable to select a nozzle where ink sticking easily progresses. In a case where the degree of progress of ink sticking is substantially equal in all nozzles of the print head, the target of the detection process is not necessarily all nozzles but may be limited to some representative nozzles out of all nozzles. In this manner, by limiting the nozzles to be a target of the detection process, it is possible to suppress the amount of ink ejection and power consumption during the ejection state detection process.

The target of the circulation operation is the inks of all colors in the present embodiment. However, for example, in a case where the circulation operation for each ink color can be individually controlled, the ink circulation operation shown in FIG. 19A may be individually performed for each ink color.

Other Embodiments

In a case where a time of print operation exceeds a predetermined time (for example, 25 seconds), the ink circulation process in each of the embodiments described above may be performed before the next print operation. Alternatively, a mechanism for detecting or predicting a temperature of the print head during print operation may be provided such that in a case where the temperature of the print head during the print operation exceeds a predetermined temperature (for example, 45° C.), the ink circulation process in each of the embodiments described above is performed before the next print operation. This is because an increase in head temperature and heat storage during print operation make moisture evaporation from nozzles more easily than usual even after the completion of the print operation and an ejection failure is likely to occur.

Alternatively, in a case where a power off time of the printing apparatus exceeds a predetermined time (for example, 64 hours), the ink circulation process in each of the embodiments described above may be performed before the next power-on. Alternatively, in a case where a non-circulation time during which ink is not circulated exceeds a predetermined time, the ink circulation process in each of the embodiments described above may be performed before the next print operation.

The present invention can also be realized by processing of supplying a program realizing one or more functions of the above-described embodiments to a system or apparatus via a network or storage medium and reading out and performing the program by one or more processors of a computer in the system or apparatus, and can also be realized by a circuit (such as ASIC) realizing one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-190490 filed Oct. 5, 2018, which is hereby incorporated by reference wherein in its entirety.

What is claimed is:

1. An inkjet printing apparatus comprising:

a print head comprising at least one ejection opening for ejecting ink, a printing element for generating energy used for ejecting ink corresponding to the ejection opening, and a pressure chamber which is an area facing to the printing element, the ejection opening ejecting ink supplied in the pressure chamber;

a decision unit configured to perform a decision operation for deciding an ink ejection state of the ejection opening;

a circulation unit configured to circulate ink from the outside of the pressure chamber to the inside of the pressure chamber and from the inside of the pressure chamber to the outside of the pressure chamber by supplying ink such that the ink flows from a first flow path for supplying ink to the pressure chamber of the print head to a second flow path, and circulate ink so that ink which has flowed through the second flow path flows through the first flow path again, the second flow path being communicated with the pressure chamber and different from the ejection opening and the first flow path; and a control unit configured to cause the decision unit to perform the decision operation in a period of circulating ink by the circulation unit.

2. The inkjet printing apparatus according to claim 1, wherein the print head comprises a plurality of ejection openings including the at least one ejection opening, and based on a decision result of the decision unit, the control unit causes the decision unit to continue the decision operation in a case where a number of inoperative ejection openings is greater than a first number and causes the decision unit to finish the decision operation in a case where the number of inoperative ejection openings is not greater than the first number.

3. The inkjet printing apparatus according to claim 2, wherein based on the decision result of the decision unit, the control unit causes the circulation unit to continue the ink circulation in a case where the number of inoperative ejection openings is greater than the first number and causes the circulation unit to stop the ink circulation in a case where the number of inoperative ejection openings is not greater than the first number.

4. The inkjet printing apparatus according to claim 2, wherein the control unit prevents the circulation unit from stopping the ink circulation until the decision unit finishes the decision operation.

5. The inkjet printing apparatus according to claim 2, wherein in a case where the number of inoperative ejection openings is not greater than the first number, in a case where next operation to be performed by the inkjet printing apparatus is not accompanied by the ink circulation, the control unit causes the circulation unit to stop the ink circulation, and in a case where the next operation is accompanied by the ink circulation, the control unit prevents the circulation unit from stopping the ink circulation.

6. The inkjet printing apparatus according to claim 5, wherein the next operation includes an operation of printing an image by using ink ejected from the print head.

7. The inkjet printing apparatus according to claim 2, wherein in a case where the number of inoperative ejection openings is greater than the first number, the control unit performs the decision operation after a lapse of a first predetermined time and prevents the circulation unit from stopping the ink circulation until the decision unit finishes the decision operation.

8. The inkjet printing apparatus according to claim 2, wherein the control unit causes the decision unit to finish the decision operation in a case where the number of inoperative ejection openings is not reduced to the first number or less within a second predetermined time from a start of the decision operation.

9. The inkjet printing apparatus according to claim 2, wherein the control unit causes the decision unit to perform the decision operation multiple times and, in a case where a determination unit determines multiple times that the number of inoperative ejection openings is equal to or less than a predetermined number, causes the decision unit to finish the decision operation.

10. The inkjet printing apparatus according to claim 1, comprising:

a cap capable of intimately contacting with the ejection opening of the print head, wherein the control unit causes the circulation unit to circulate ink with the ejection opening in intimate contact with the cap into which ink is ejected from the ejection opening.

11. The inkjet printing apparatus according to claim 1, wherein the print head is capable of ejecting a plurality of inks, the control unit causes the circulation unit to circulate ink through a flow path for each of the plurality of inks, and the decision unit performs the decision operation for a specific ink out of the plurality of inks.

12. The inkjet printing apparatus according to claim 11, wherein the plurality of inks include inks having different thickening properties, which are degrees of thickening caused by moisture evaporation from ink, and the specific ink is an ink having a relatively high thickening property.

13. The inkjet printing apparatus according to claim 1, wherein the printing element is an electrothermal transducing element, and the decision unit comprises a temperature decision element configured to decide a temperature of the electrothermal transducing element.

14. The inkjet printing apparatus according to claim 1, wherein the print head is capable of ejecting ink from the plurality of ejection openings, the circulation unit circulates ink through each of flow paths of the plurality of ejection openings, the control unit causes the circulation unit to perform the ink circulation and performs the decision operation for an ejection opening selected from the plurality of ejection openings.

15. The inkjet printing apparatus according to claim 13, wherein the decision unit decides the ink ejection state in the print head based on a temperature change in the electrothermal transducing element in a case where ink is ejected from the ejection opening, the temperature change being decided by the temperature decision element.

16. The inkjet printing apparatus according to claim 1, wherein the control unit causes the decision unit to perform the decision operation in response to start of ink circulation of the circulation unit.

17. The inkjet printing apparatus according to claim 1, further comprising:

a tank configured to store ink to be supplied to the print head;

a third flow path configured to flow ink from the tank to the first flow path of the print head; and a fourth flow path configured to flow ink from the second flow path of the print head to the tank, wherein the circulation unit circulates the ink between the tank and the print head such that the ink flows from the tank to the pressure chamber and from the pressure chamber to the tank.

18. The inkjet printing apparatus according to claim 1, wherein the decision unit comprises a decision element provided corresponding to the printing element in the print head.

19. The inkjet printing apparatus according to claim 1, wherein the control unit causes the circulation unit to stop circulating ink from the outside of the pressure chamber to the inside of the pressure chamber and from the inside of the pressure chamber to the outside of the pressure chamber in response to finish the decision operation.

20. An inkjet printing apparatus comprising:

a print head comprising at least one ejection opening for ejecting ink;

a tank configured to store ink to be supplied to the print head;

a first flow path configured to flow ink from the tank to the print head;

a second flow path configured to flow ink so that ink which has flowed through the first flow path and through the second flow path flows through the first flow path again;

a decision unit configured to perform a decision operation for deciding an ink ejection state of the ejection opening;

a circulation unit configured to circulate ink in a circulation path including the first flow path and the second flow path so that ink which has flowed through the second flow path flows through the first flow path again; and a control unit configured to cause the circulation unit to circulate ink and to cause the decision unit to perform the decision operation in a period of circulating ink by the circulation unit.

21. The inkjet printing apparatus according to claim 20, wherein the print head comprises a plurality of ejection openings including the at least one ejection opening, and based on a decision result of the decision unit, the control unit causes the decision unit to continue the decision operation in a case where a number of inoperative ejection openings is greater than a first number and causes the decision unit to finish the decision operation in a case where the number of inoperative ejection openings is not greater than the first number.

22. The inkjet printing apparatus according to claim 21, wherein based on the decision result of the decision unit, the control unit causes the circulation unit to continue the ink circulation in a case where the number of inoperative ejection openings is greater than the first number and causes the circulation unit to stop the ink circulation in a case where the number of inoperative ejection openings is not greater than the first number.

23. The inkjet printing apparatus according to claim 21, wherein the control unit prevents the circulation unit from stopping the ink circulation until the decision unit finishes the decision operation.

24. The inkjet printing apparatus according to claim 21, wherein in a case where the number of inoperative ejection openings is not greater than the first number, in a case where next operation to be performed by the inkjet printing apparatus is not accompanied by the ink circulation, the control unit causes the circulation unit to stop the ink circulation, and in a case where the next operation is accompanied by the ink circulation, the control unit prevents the circulation unit from stopping the ink circulation.

25. The inkjet printing apparatus according to claim 20, wherein the control unit causes the decision unit to perform the decision operation in response to start of ink circulation of the circulation unit.

26. The inkjet printing apparatus according to claim 20, wherein the control unit causes the circulation unit to stop circulating ink from the outside of the pressure chamber to the inside of the pressure chamber and from the inside of the pressure chamber to the outside of the pressure chamber in response to finish of the decision operation.

27. An inkjet printing method, comprising:

a circulation step of circulating ink in a print head comprising at least one ejection opening for ejecting ink, a printing element for generating energy used for ejecting ink corresponding to the ejection opening, and a pressure chamber which is an area facing to the printing element, the ejection opening ejecting ink supplied in the pressure chamber, so as to circulate ink from the outside of the pressure chamber to the inside of the pressure chamber and from the inside of the pressure chamber to the outside of the pressure chamber by supplying ink such that the ink flows from a first flow path for supplying ink to the pressure chamber of the print head to a second flow path, so that ink which has flowed through the second flow path flows through the first flow path again, the second flow path being communicated with the pressure chamber and different from the ejection opening and the first flow path, and a decision step of deciding an ink ejection state of the ejection opening in a period of circulating ink in the circulation step.

28. The inkjet printing method according to claim 27, wherein the decision of the ink ejection state in the decision step is performed in response to start of ink circulation in the circulation step.

29. The inkjet printing method according to claim 27, wherein the ink circulation in the circulation step is prevented from stopping until the decision operation in the decision step is finished.

30. The inkjet printing method according to claim 27, wherein the ink circulation in the circulation step is stop in response to finish of the decision operation in the decision step.

31. A non-transitory computer readable storage medium storing a program for causing a computer to function as an inkjet printing apparatus, the inkjet printing apparatus comprising:

a print head comprising at least one ejection opening for ejecting ink, a printing element for generating energy used for ejecting ink corresponding to the ejection opening, and a pressure chamber which is an area facing to the printing element, the ejection opening ejecting ink supplied in the pressure chamber;

a decision unit configured to perform a decision operation for deciding an ink ejection state of the ejection opening;

a circulation unit configured to circulate ink from the outside of the pressure chamber to the inside of the pressure chamber and from the inside of the pressure chamber to the outside of the pressure chamber by supplying ink such that the ink flows from a first flow path for supplying ink to the pressure chamber of the print head to a second flow path, and circulate ink so that ink which has flowed through the second flow path flows through the first flow path again, the second flow path being communicated with the pressure chamber and different from the ejection opening and the first flow path; and a control unit configured to cause the decision unit to perform the decision operation in a period of circulating ink by the circulation unit.

32. A non-transitory computer readable storage medium storing a program for causing a computer to function as an inkjet printing apparatus, the inkjet printing apparatus comprising:

a print head comprising at least one ejection opening for ejecting ink;

a tank configured to store ink to be supplied to the print head;

a first flow path configured to flow ink from the tank to the print head;

a second flow path configured to flow ink so that ink which has flowed through the first flow path and through the second flow path flows through the first flow path again;

a decision unit configured to perform a decision operation for deciding an ink ejection state of the ejection opening;

a circulation unit configured to circulate ink in a circulation path including the first flow path and the second flow path so that ink which has flowed through the second flow path flows through the first flow path again; and a control unit configured to cause the circulation unit to circulate ink and to cause the decision unit to perform the decision operation in a period of circulating ink by the circulation unit.

33. The inkjet printing apparatus according to claim 1, comprising a third flow path configured to flow ink from a tank which is configured to store ink to be supplied to the first flow path of the print head; and a fifth flow path whose one end is connected to the third flow path and which is configured to return a part of ink in the third flow path to a position in the third flow path upstream from a connecting portion of the one end.

34. The inkjet printing apparatus according to claim 33, comprising a valve located in the fifth flow path.

35. The inkjet printing apparatus according to claim 34, wherein the one end of the fifth flow path and its other end are both connected to the third flow path.

36. The inkjet printing apparatus according to claim 34, wherein the valve is configured to, in a case where the pressure of the pumped ink in the third flow path is larger than a predetermined value, open the fifth flow path so as to allow ink in the fifth flow path to flow from a downstream side of the third flow path to an upstream side of the third flow path.

37. The inkjet printing apparatus according to claim 33, comprising a pressure control unit located in a flow path between the fifth flow path and the pressure chamber and configured to open the flow path so as to flow ink from the first flow path to the pressure chamber caused by a negative pressure.

38. The inkjet printing apparatus according to claim 37, wherein the inkjet printing apparatus comprises two said pressure control units.

39. The inkjet printing apparatus according to claim 20, comprising a third flow path configured to flow ink from a tank which is configured to store ink to be supplied to the first flow path of the print head; and a fifth flow path whose one end is connected to the third flow path and which is configured to return a part of ink in the third flow path to a position upstream from a connecting portion of the third flow path and the fifth flow path.

40. The inkjet printing apparatus according to claim 39, comprising a valve located in the fifth flow path.

41. The inkjet printing apparatus according to claim 40, wherein the one end of the fifth flow path and its other end are both connected to the third flow path.

42. The inkjet printing apparatus according to claim 40, wherein the valve is configured to, in a case where the pressure of the pumped ink in the third flow path is larger than a predetermined value, open the fifth flow path so as to allow ink in the fifth flow path to flow from a downstream side of the third flow path to an upstream side of the third flow path.

43. The inkjet printing apparatus according to claim 39, comprising a pressure control unit located in a flow path between the fifth flow path and the pressure chamber and configured to open the flow path so as to flow ink from the first flow path to the pressure chamber caused by a negative pressure.

44. The inkjet printing apparatus according to claim 43, wherein the inkjet printing apparatus comprises two said pressure control units.

45. The inkjet printing apparatus according to claim 1, comprising:

a tank configured to store ink to be supplied to the print head;

a third flow path configured to flow ink from the tank to the first flow path of the print head; and a fourth flow path configured to flow ink so that ink which has flowed through the first flow path and through the second flow path flows the first flow path again, wherein the circulation unit circulates the ink in a circulation path including the first flow path and the second flow path so that ink which has flowed through the second flow path flows through the first flow path again.

* * * * *